United States Patent
Inbar et al.

(10) Patent No.: US 7,932,925 B2
(45) Date of Patent: Apr. 26, 2011

(54) SYSTEM AND METHOD FOR STABILIZING AN IMAGE

(75) Inventors: Shamir Inbar, Haifa (IL); Gavriel Davidov, Kfar Vradim (IL)

(73) Assignee: Elbit Systems Ltd., Haifa (IL)

( * ) Notice: Subject to any disclaimer, the term of this patent is extended or adjusted under 35 U.S.C. 154(b) by 900 days.

(21) Appl. No.: 11/667,737

(22) PCT Filed: Nov. 6, 2005

(86) PCT No.: PCT/IL2005/001159
§ 371 (c)(1),
(2), (4) Date: May 14, 2007

(87) PCT Pub. No.: WO2006/051525
PCT Pub. Date: May 18, 2006

(65) Prior Publication Data
US 2008/0136923 A1   Jun. 12, 2008

(30) Foreign Application Priority Data
Nov. 14, 2004  (IL) .......................................... 165190

(51) Int. Cl.
H04N 5/228 (2006.01)
(52) U.S. Cl. ..................................... 348/208.2; 348/169
(58) Field of Classification Search ............. 348/208.99, 348/208.1–208.16, 143, 154, 155, 169–172
See application file for complete search history.

(56) References Cited

U.S. PATENT DOCUMENTS 4,637,571 A   1/1987 Holder et al.
4,864,409 A   9/1989 Platte et al.

(Continued)

FOREIGN PATENT DOCUMENTS

DE   32 43 486   5/1984

(Continued)

OTHER PUBLICATIONS

"Annex C An Overview of the Allan Variance Method of IFOG Noise Analysis (Informative)" IEEE Specification Formal Guide, Document No. P952/D20, 1995.

(Continued)

*Primary Examiner* — Nelson D. Hernández Hernández
(74) *Attorney, Agent, or Firm* — Merchant & Gould P.C.

(57) ABSTRACT

System for producing a stabilized image of a scene viewed by an image detector, the image detector detecting a plurality of images of the scene, the image detector being supported by gimbals, the gimbals including a servo system for moving the gimbals at least one degree of freedom, the system including an angular movement detection device firmly coupled with the image detector, and a processor coupled with the angular movement detection device and with the image detector, the angular movement detection device detecting at least a portion of angular movements of the image detector about at least one axis of rotation, the angular movement detection device producing an angular output respective of the portion, the processor receiving the images from the image detector, and the angular output from the angular movement detection device, the processor determining at least one shifting displacement and at least one shifting direction for shifting a current image detected by the image detector, relative to a reference image of the scene detected by the image detector, according to the angular output, the processor producing the stabilized image, by shifting the current image by the shifting displacement and in the shifting direction.

50 Claims, 12 Drawing Sheets

U.S. PATENT DOCUMENTS

| | | | |
|---|---|---|---|
| 5,125,595 A | 6/1992 | Helton | |
| 5,754,226 A | 5/1998 | Yamada et al. | |
| 6,295,139 B1* | 9/2001 | Yamauchi et al. | 358/443 |
| 6,429,895 B1 | 8/2002 | Onuki | |
| 2003/0076408 A1* | 4/2003 | Dutta | 348/61 |
| 2006/0044399 A1* | 3/2006 | Fredlund et al. | 348/207.99 |
| 2006/0291693 A1* | 12/2006 | Olson et al. | 382/103 |

FOREIGN PATENT DOCUMENTS

| | | |
|---|---|---|
| EP | 0 569 709 A1 | 11/1993 |
| EP | 0 667 708 A1 | 8/1995 |
| GB | 2 162 019 | 1/1986 |
| WO | WO 99/01845 | 1/1999 |

OTHER PUBLICATIONS

Shmuel Merhav et al. *Aerospace Sensors Systems and Applications.* ISBN 0-387-94605-5, 1996, Chapters 7 and 8, pp. 349-394.

Oshima et al. "VHS Camcorder with Electronic Image Stabilizer." *IEEE Transactions on Consumer Electronics.* vol. 35. No. 4. 1989. pp. 749-757.

Nygards et al. "Navigation Aided Image Processing in UAV Surveillance: Preliminary Results and Design of an Airborne Experimental System." *Journal of Robotic Systems.* vol. 21, No. 2. 2004. pp. 63-72.

Algrain et al. "Accelerometer Based Line-of-Sight Stabilization Approach for Pointing and Tracking Systems." *IEEE Conference on Control Applications.* 1993. pp. 159-163.

* cited by examiner

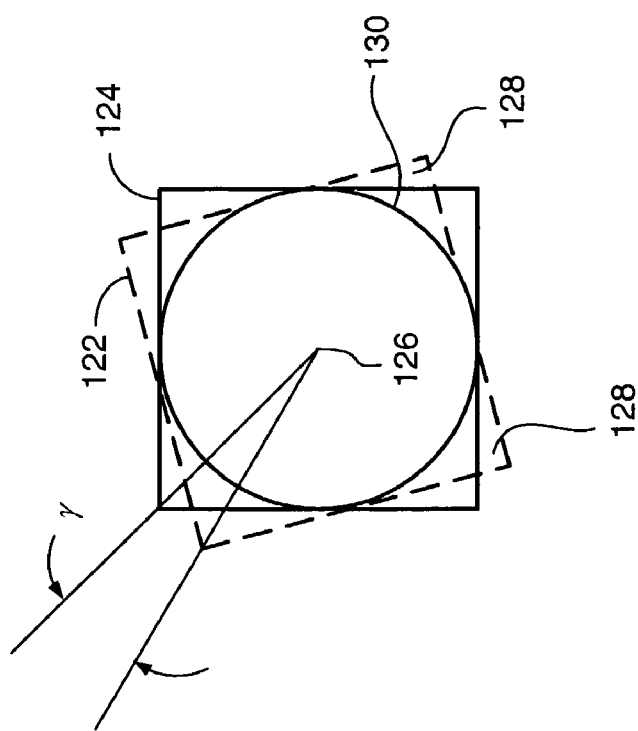
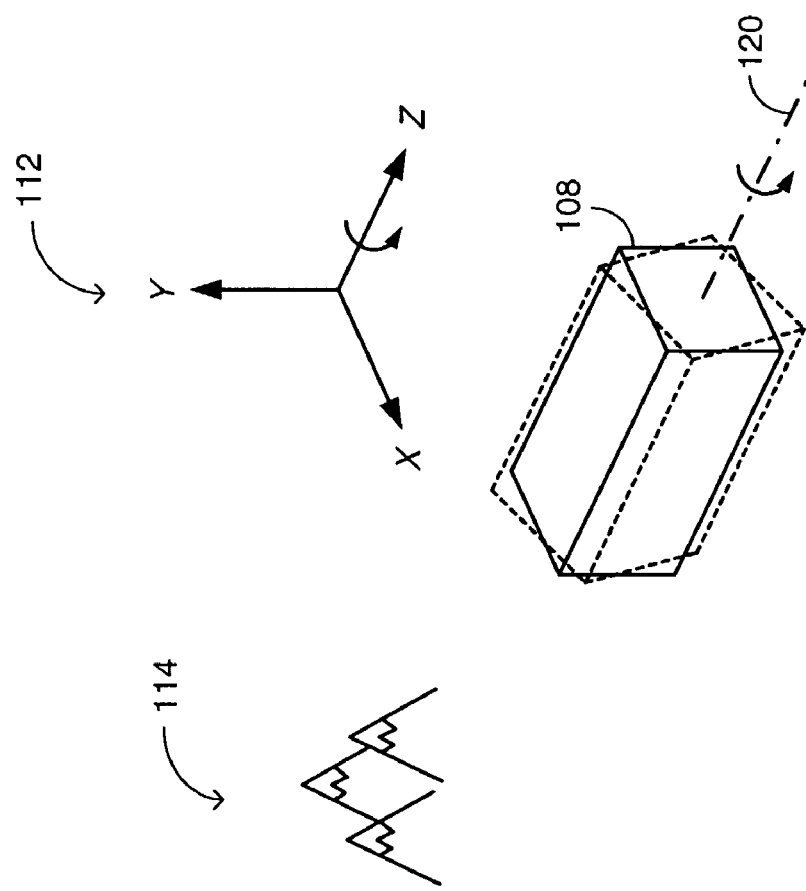
FIG. 2E
FIG. 2D

SYSTEM AND METHOD FOR STABILIZING AN IMAGE

FIELD OF THE DISCLOSED TECHNIQUE

The disclosed technique relates to image detectors in general, and to methods and systems for stabilizing an image, in particular.

BACKGROUND OF THE DISCLOSED TECHNIQUE

An image detector is generally subject to vibrations which might distort a detected image of a scene. The vibrations can be linear—where the image detector undergoes a linear displacement, as well as angular—where the image detector rotates about one or more axes. In case of an observation post, these vibrations may be caused by seismic waves, wind, or a rail car passing by. In case of an image detector mounted on a ground vehicle, the image can be distorted as a result of the vibrations of the engine and the road itself. In case of an image detector mounted on a marine vessel, the image can be distorted as a result of ocean waves. Likewise, image distortion can occur in images detected by an image detector mounted to a ground vehicle, an airborne platform, such as an aircraft, a helicopter or a satellite.

Methods for compensating for the vibrations and noise in order to obtain a stabilized image are known in the art. For example, a gyroscope connected to the image detector detects the inertial rotations of the image detector, and a servo system (including a servo motor and a controller) rotates the gimbals on which the image detector is mounted, in the opposite direction and by the same amount, according to the output of the gyroscope. The image can be further refined by employing additional gyroscopes and by providing each gyroscope additional degrees of freedom.

An alternative method for stabilizing the detected image is by processing the detected image via an image processor (i.e., correlator). The correlator detects movement of landmarks within the image, and between consecutive images, by processing the image. The correlator, then stabilizes the image by shifting the pixels in the image by the detected amount of movement, and in the opposite direction. However, the operation of the correlator is ineffective in case the signal to noise ratio (SNR) of the light reaching the image detector is low (e.g., in case of a night vision system). Furthermore, the operation of the correlator is limited to a stationary platform (e.g., an observation mast), a vehicle which moves directly toward the scene while the line of sight of the image detector remains constant, or in case a user of the moving vehicle moves the image detector to maintain a constant line of sight, despite the movements of the vehicle.

The optical assembly which is located in front of the image detector, generally includes one or more mirrors. A further alternative method for stabilizing the detected image, is by allowing all the mirrors to move as a result of the vibrations except one, and moving that mirror by an amount proportional to the vibrations and in the opposite direction.

Reference is now made to FIG. 1, which is a schematic illustration of a system, generally referenced 50, for providing a stabilized image of a scene detected by an image detector subjected to external disturbances, as known in the art. System 50 includes an image detection frame 52, a correlator 54 and a display 56. Image detection frame 52 includes an image detector 58 and gimbals 60. Gimbals 60 include a gyroscope 62, a movement processor 64 and a servo motor 66.

Image detection frame 52 is a pedestal which is mounted to an aircraft (not shown). Gimbals 60 are mechanically connected to image detection frame 52. Image detector 58, gyroscope 62 and servo motor 66 are mechanically connected to gimbals 60. Correlator 54 is electrically connected to image detector 58 and to display 56. Movement processor 64 is electrically connected with gyroscope 62 and with servo motor 66. Gimbals 60 is a three degrees of freedom (DOF) mechanism.

Gyroscope 62 is in form of a spinning solid body (not shown) having such a moment of inertia that a rotating shaft (not shown) which supports the solid body, points to a predetermined direction relative to the Earth, despite changes in direction of flight of the aircraft (i.e., an gyroscope 62 is an electromechanical gyroscope). Gimbals 60 can move about the X, Y and Z axes of a three-dimensional Cartesian coordinate system 70. Since image detector 58 is firmly connected with gimbals 60, image detector 58 can also move about the X, Y and Z axes.

Image detector 58 detects an image (not shown) of a scene 68 while being subject to random disturbances caused by the powerplant of the aircraft and aerodynamic forces. Since image detector 58 is firmly connected to the aircraft, these disturbances are transmitted to image detector 58, and thus display 56 produces a distorted image of scene 68.

Gyroscope 62 detects rotations of image detector 58 about the X, Y and Z axes (i.e., pitch, yaw and roll, respectively) due to the disturbances and produces an output angle to movement processor 64. Movement processor 64 determines a counteractive movement to be applied to image detector 58, in order to cancel out the rotations of image detector 58 due to the disturbances and to stabilize the detected image. Movement processor 64 directs servo motor 66 to move gimbals 60 about the X, Y and Z axes by the respective amplitude of disturbance and in the opposite direction, thereby mechanically stabilizing image detector 58. Display 56 displays a stabilized image of scene 68.

Alternatively or additionally, correlator 54 performs frame-to-frame inspection of the image detected by image detector 58, by employing an image processing procedure. When correlator 54 detects that the location of a landmark (not shown) in the current image of scene 68 is different than the one in the previous image, relative to the background (not shown), correlator 54 shifts the current image in a direction opposite to the detected direction and by an equal amount, along the X and Y axes. Thus, correlator 54 corrects for fine disturbances of substantially small amplitudes and substantially large frequencies (e.g., 5 microradians and 200 Hz) transmitted to image detector 58 about the X, Y and Z axes.

The performance level of correlator 54 is a function of the SNR of the video signal received by correlator 54. Therefore, correlator 54 can produce a stabilized image in the daytime when the light intensity and the SNR is large. However, this is not the case if system 50 operates in a dark environment where a substantially small amount of light photons reach image detector 58 per unit of time, and if the SNR of the signal at the input of correlator 54 is much lower than in the case of a daytime operation.

Correlator 54 can correct image disturbances caused by angular disturbances of up to a few milliradians. The degree of image stabilization of the image displayed by display 56 also depends on the frame rate of display 56. For example, at 30 frames per second, correlator 54 can correct image disturbances caused by vibrations up to three Hertz, or less than one Hertz. This is due to the limitations of the algorithm of correlator 54 at this frame rate and frequencies. Furthermore, the algorithm is not responsive to images which are substantially blurred.

In order for display 56 to produce high resolution images of scene 68 located at a large range, image detector 58 has to be stabilized to five microradians root mean square (rms) or less. However, with the arrangement of system 50 as described herein above, image detector 58 can be stabilized to between 10 and 30 microradians rms. Furthermore, acceptable images at a sufficient contrast level and detailed data, can be obtained at disturbances at frequencies of up to a few Hertz or less than one Hertz. and limited to a good images quality with enough details and contrast to observe and for external vibration frequencies of less than 1-3 Hz Alternatively, gimbals 60 can have one DOF, in which case image detector 58 is free to rotate only about the X axis. Further alternatively, gimbals 60 can have two DOFs, in which case image detector 58 is free to rotate about the X and Y axes. For example, if the image is stabilized only against yaw of the aircraft, then gimbals 60 has one DOF. If the image is stabilized both against yaw and pitch of the aircraft, then gimbals 60 has two DOFs. If the image is stabilized against yaw, pitch and roll of the aircraft, then gimbals 60 has three DOFs.

Gimbals 60 is stabilized by employing a plurality of springs (not shown), dampener, servo motor control system (not shown), inertial sensor (not shown), encoder, resolver, potentiometer, or tachometer, in order to compensate for large amplitude disturbances. Due to limited mechanical stiffness, control system noise, and control system gain, and due to friction, backlash, and mechanical resonance, gimbals 60 have a limited stabilization bandwidth. Generally, they gimbals 60 can be stabilized against disturbances caused by wind and ocean waves (i.e., one Hz or less), by movement of a ground vehicle, flight disturbances, seismic waves between three to four Hertz, and the like. Thus, gimbals 60 can be stabilized against harmonic disturbances at an amplitude of several degrees and at frequencies less than 25 Hz. Furthermore, gimbals 60 dampen harmonic disturbances at amplitudes of less than several tens and hundreds microradians, excluding other disturbances—at higher frequencies. Vibrations caused by, for example, helicopter rotors, aircraft propellers, jet engines, a motor boat, ship, machine gun, power train of a ground vehicle, construction machinery, turning machines, milling machines, and the like, are at several tens of Hertz. In case the vibrations are greater than 50 Hz, inertial servo control assemblies are not capable to stabilize gimbals 60 at an accuracy of a few microradians.

Disturbances which are transmitted to image detector 58 after stabilizing gimbals 60 (i.e., residual disturbances) generally cause image distortion. System 50 can stabilize the detected image to high accuracies of 20-100 microradians or lower accuracies of 1000-3000 microradians, at angular disturbances of less than several tens of degrees per second, and at frequencies between zero to several Hz. However, in case accuracies of better than 5 microradians are required, at residual disturbances of 20-200 Hz and an amplitude of a few hundred microradians, system 50 is not capable to stabilize the detected image.

U.S. Pat. No. 5,754,226 issued to Yamada et al., and entitled "Imaging Apparatus for Obtaining a High Resolution Image" is directed to an imaging apparatus which provides an image of a subject at a resolution higher than that obtained by an imaging plate. An actuator changes the angle of inclination of a transparent refracting plate according to a control signal received from a control section, thereby refracting an incident image light and shifting the position of an image formed on an imaging plate. The actuator changes the angle of inclination of the transparent refracting plate, so that an image $K_{10}$ horizontally shifted by half a pixel, an image $K_{11}$ vertically shifted by half a pixel, and an image $K_{11}$ horizontally and vertically shifted by half a pixel, with respect to a reference image $K_{00}$, are formed on the imaging plate.

A synthesis section synthesizes respective images $I_{10}$, $I_{01}$, $I_{11}$, and $I_{00}$ into a single image in which the horizontal and vertical sampling frequencies are respectively doubled. A motion vector detecting section detects motion vectors of the images $I_{10}$, $I_{01}$, and $I_{11}$, with respect to the reference image $I_{00}$. The synthesis section synthesizes the four images $I_{10}$, $I_{01}$, $I_{11}$, and $I_{00}$ based on the motion vectors detected by the motion vector detecting section.

U.S. Pat. No. 6,429,895 B1 issued to Onuki and entitled "Image Sensing Apparatus and Method Capable of Merging Function for Obtaining High-Precision Image by Synthesizing Images and Image Stabilization Function" is directed to an image sensing apparatus which improves the resolution of an image of an object and stabilizes the image in a vibrating environment. A focusing actuator moves a first lens group back and forth along the optical axis to perform focus control. A focus detects the position of the first lens group. Vibration-type gyroscopes sense the angular vibration in the vertical and the horizontal direction of the image sensing apparatus.

U.S. Pat. No. 5,125,595 issued to Helton and entitled "Digital Image Stabilization System for Strapdown Missile Guidance", is directed to a strapdown missile guidance system which maintains an image of a target within plus or minus 50% of a field of view of a sensor, at all times during the flight of a missile. A rate gyro measures the rate of motion of the missile and produces a rate output. A pick-off device constantly measures the angle between the missile and the sensor, and produces angular data. A camera senses the target position, produces a respective video data output and inputs this video data to a digital image processor. A tracker produces DC signals which are indicative of the position of the target within the field of view of the sensor. An electronic integrator produces an electronic gimbal angle, inputs the electronic gimbal angle to a motor, and the motor moves the sensor with respect to the missile.

SUMMARY OF THE DISCLOSED TECHNIQUE

It is an object of the disclosed technique to provide a novel method and system for stabilizing an image of a scene.

In accordance with the disclosed technique, there is thus provided a system for producing a stabilized image of a scene viewed by an image detector. The image detector detects a plurality of images of the scene and is supported by gimbals. The gimbals include a servo system for moving the gimbals at least one degree of freedom. The system includes an angular movement detection device firmly coupled with the image detector, and a processor coupled with the angular movement detection device and with the image detector. The angular movement detection device detects at least a portion of angular movements of the image detector about at least one axis of rotation.

The angular movement detection device produces an angular output respective of that portion of angular movements. The processor receives the images from the image detector, and receives the angular output from the angular movement detection device. The processor determines at least one shifting displacement and at least one shifting direction for shifting a current image detected by the image detector, relative to a reference image of the scene detected by the image detector. The processor determines the shifting displacement according to the angular output. The processor produces the stabilized image, by shifting the current image by the shifting displacement and in the shifting direction.

In accordance with another aspect of the disclosed technique, there is thus provided a method for producing a stabilized image of a scene viewed by an image detector. The method includes the procedures of producing a reference angular output respective of at least a portion of angular movements of the image detector, and producing a current angular output respective of that portion of the angular movements. The method further includes the procedures of determining at least one shifting displacement and at least one shifting direction, and shifting the current image by the shifting displacement and in the shifting direction.

The reference angular output is associated with a reference image of the scene detected by the image detector. The current angular output is associated with a current image of the scene detected by the image detector. The shifting displacement and the shifting direction are determined for shifting the current image relative to the reference image. The shifting displacement and the shifting direction are determined by comparing the current angular output with the reference angular output.

In accordance with a further aspect of the disclosed technique, there is thus provided a system for producing a stabilized image of a scene viewed by an image detector. The image detector detects a plurality of images of the scene, and is supported by gimbals. The gimbals include a servo system for moving the gimbals at least one degree of freedom. The system includes a first angular movement detection device firmly coupled with the image detector, a processor coupled with the first angular movement detection device and with the image detector, a second angular movement detection device coupled with the image detector, and a movement processor coupled with the second angular movement detection device and with the servo system.

The first angular movement detection device detects at least a portion of angular movements of the image detector about at least one axis of rotation. The first angular movement detection device produces a first angular output respective of that portion of the angular movements. The processor receives the images from the image detector. The processor receives the first angular output from the first angular movement detection device. The processor determines a first shifting displacement and a first shifting direction for shifting a current image detected by the image detector, relative to a reference image of the scene detected by the image detector. The processor determines the first shifting displacement and the first shifting direction, according to the first angular output.

The processor produces the stabilized image by shifting the current image by the first shifting displacement and in the first shifting direction. The processor detects at least one displacement of the current image relative to a previous image included in the images, in at least one direction. The processor determines a second shifting displacement to shift the current image relative to the previous image, in a second shifting direction, substantially opposite to the direction of the detected displacement. The processor shifts the current image by the second shifting displacement, in the second direction.

The second angular movement detection device detects at least another portion of the angular movements, and produces a second angular output respective of that other portion of the angular movements. The movement processor determines at least one compensating movement for the image detector, according to the second angular output. The servo system moves the image detector according to the compensating movement.

In accordance with another aspect of the disclosed technique, there is thus provided a device for producing a stabilized image of a scene viewed by an image detector. The image detector detects a plurality of images of the scene, and is supported by gimbals. The gimbals include a servo system, a first angular movement detection device, and a movement processor. The servo system moves the gimbals at least one degree of freedom. The first angular movement detection device detects at least one portion of angular movements of the image detector. The angular movement detection device produces a first angular output respective of that portion of the angular movements.

The movement processor determines at least one compensating movement for the image detector, according to the first angular output. The servo system moves the image detector according to the compensating movement. The system further includes a first processor receiving the images from the image detector. The first processor detects at least one displacement of a current image of the scene detected by the image detector, relative to a previous image included in the images, in at least one direction.

The first processor determines a first shifting displacement to shift the current image relative to the previous image, in a first shifting direction substantially opposite to the direction for the detected displacement. The first processor shifts the current image by the first shifting displacement, in the first direction. The device includes a second angular movement detection device firmly coupled with the image detector, and a second processor coupled with the second angular movement detection device, the image detector, and with the first processor.

The second angular movement detection device detects at least another portion of the angular movements and produces a second angular output respective of that other portion of the angular movements. The second processor receives the images from the image detector, and the second angular output from the second angular movement detection device. The second processor determines a second shifting displacement and a second shifting direction for shifting the current image, relative to a reference image of the scene detected by the image detector, according to the second angular output. The second processor produces the stabilized image by shifting the current image by the second shifting displacement and in the second shifting direction.

In accordance with a further aspect of the disclosed technique, there is thus provided an apparatus for viewing a substantially blur-free image of a scene. The apparatus includes an optical assembly and a system for producing a stabilized image of the scene viewed by an image detector. The image detector detects a plurality of images of the scene and is supported by gimbals. The gimbals include a servo system for moving the gimbals at least one degree of freedom. The apparatus includes an angular movement detection device firmly coupled with the image detector, and a processor coupled with the angular movement detection device and with the image detector.

The angular movement detection device detects at least a portion of angular movements of the image detector about at least one axis of rotation. The angular movement detection device produces an angular output respective of that portion of the angular movements. The processor receives the images from the image detector, and the angular output from the angular movement detection device. The processor determines at least one shifting displacement and at least one shifting direction for shifting a current image detected by the image detector, relative to a reference image of the scene detected by the image detector, according to the angular output. The processor produces the stabilized image, by shifting the current image by the shifting displacement and in the shifting direction.

BRIEF DESCRIPTION OF THE DRAWINGS

The disclosed technique will be understood and appreciated more fully from the following detailed description taken in conjunction with the drawings in which:

FIG. 2D is a schematic illustration of a roll motion of the image detector of FIG. 2A about an axis of rotation thereof, due to a disturbance;

FIG. 2E is a schematic illustration of an image of the scene of FIG. 2A, shifted by the processor of the system of FIG. 2A, in a direction opposite to the roll of the image detector illustrated in FIG. 2D, and by a displacement proportional to the roll of the image detector;

DETAILED DESCRIPTION OF THE EMBODIMENTS

Figure 1:
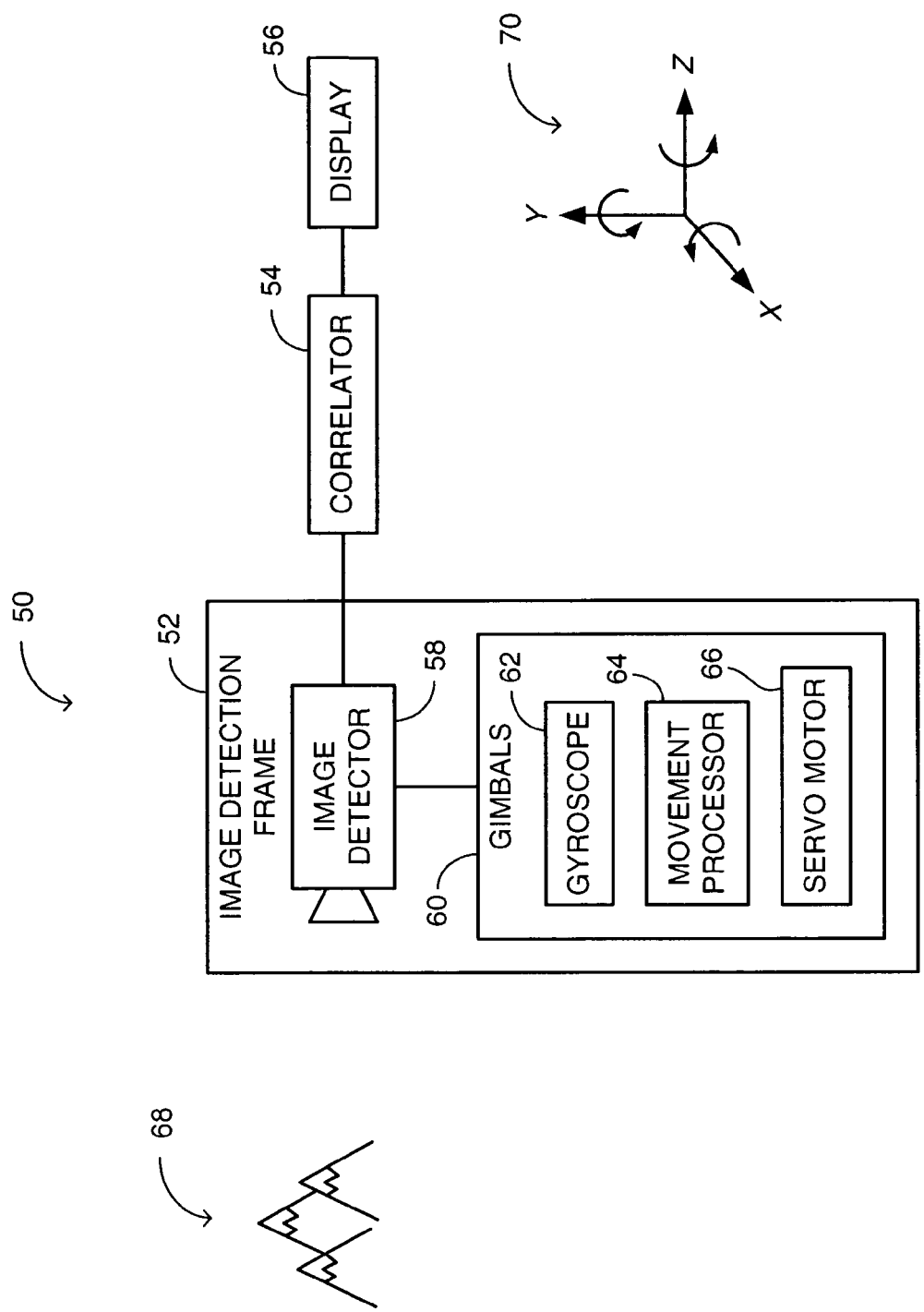
FIG. 1 is a schematic illustration of a system, for providing a stabilized image of a scene detected by an image detector subjected to external disturbances, as known in the art.

The disclosed technique overcomes the disadvantages of the prior art by shifting the detected image relative to a spatial and temporal baseline, according to the output of an angular movement detector (e.g., gyroscope, inertial sensor). The detected image is shifted in a direction opposite to the direction of movement of the image detector (e.g., yaw, pitch, roll), and by an amount proportional to the movement of the image detector.

The term "image detector" herein below, refers to a device which detects an image of a scene, such as a forward looking infrared camera (FLIR), gated camera, television camera, high definition television camera (HDTV), and the like. The image detector generally employs a charge-coupled device (CCD), complementary metal oxide semiconductor (CMOS), and the like, to detect an image of the scene. A gated camera is a video camera whose shutter is operated according to the pulse rate of a laser which is transmitted to the scene and reflected from the scene, in order to collect the reflected photons for a predetermined period of time and thus, achieve an acceptable signal to noise ratio (SNR).

The term "angular movement detection device" herein below, refers to a device which can detect rotation of the image detector, about any one of three axes of a three-dimensional coordinate system (i.e., pitch, yaw and roll). The angular movement detection device can include a plurality of angular movement detectors, each dedicated for detecting a predetermined angular movement (i.e., pitch, yaw or roll). The angular movement detection device can be a gyroscope, an inertial measurement unit (IMU), inertial navigation system (INS), an inertial sensor, and the like. The gyroscope can be an electromechanical free gyro (FG), rate gyro (RT), rate integrating gyro (RIG), dynamically tuned gyro (DTG), coriolis gyro, interferometric fiber optic gyro (IFOG), ring laser gyro (RLG), and the like.

FG is a two degree of freedom (DOF) gyro which includes a spinning mass having a substantially large angular momentum. The FG outputs signals respective of two inertial angles. RT is a one DOF gyro which includes a first assembly and a second assembly. A spinning mass is coupled with the first assembly and one or more springs (e.g., torsion bar) are coupled between the first assembly and the second assembly, wherein the springs stabilize the spinning mass. RT outputs an angular velocity value signal. RIG is similar to RT, except that the springs are replaced by a servo control system. The control system directs a servo torque motor to stabilize the spinning mass. The angular velocity is proportional to the current drawn by the servo torque motor to stabilize the spinning mass.

DTG is similar to RT, except that the mass spins at such a speed, which that the stiffness of the torsion bar stiffness to be is negligible. Thus, the spinning mass rotates freely in the space of the within a gyro box. Two perpendicular servo electromagnets stabilize the spinning mass to the box horizontally. The external angular velocities (i.e., pitch and roll) acts on the of the gyro box—their values are now proportional to the currents drawn by the electromagnets to stabilize the spinning mass.

The Coriolis gyro is based on the Coriolis Effect and includes a vibrating beam. The direction of vibration of the vibrating beam changes, when the gyro moves about an axis thereof, at a certain angular velocity, due to an external force. The direction of vibration of the vibrating beam is maintained constant, by applying a force to the vibrating beam. The force can be applied by employing one or more electrical elements, such as capacitor, electromagnet, electrostatic source, and the like. The angular velocity is proportional to the current drawn by the electrical element. The Coriolis gyro is implemented in a micro electro mechanical system (MEMS) technology.

IFOG is a Sagnac interferometer including a fiber optic coil in which a closed optical path is provided to detect the angular velocity by detecting light interference of two counter rotating light beams. A description of IFOG can be found for example, in *Aerospace Sensors Systems and Applications*, Shmuel Merhav, Springer Verlag, ISBN 0-387-94605-5, 1996, Chapter 7.

RLG is a Sagnac interferometer including a plurality of reflectors arranged in a polygonal geometry. A laser oscillates between the reflectors in two opposite directions. If the RLG is substantially stationary, then the two counter rotating lasers oscillate at substantially the same frequency. When the RLG rotates, the frequencies of the two counter rotating lasers are different, wherein the frequency difference is proportional to the angular velocity. A description of RLG can be found for example, in *Aerospace Sensors Systems and Applications*, Shmuel Merhav, Springer Verlag, ISBN 0-387-94605-5, 1996, Chapter 8.

IMU includes three gyroscopes and three linear accelerometers. Each gyroscope measures the angular velocity about a respective axis, and each accelerometer measures the linear acceleration along the respective axis. INS is similar to an IMU which additionally includes a processor running a dedicated software. An inertial sensor is a device which measures inertial position, inertial velocity, or inertial acceleration. The inertial sensor can be an accelerometer, an inclinometer, an IMU, and the like.

An accelerometer can be in form of a pendulum which operates either in an open loop control system or a closed loop control system. The pendulum is coupled with a base via a spring. In an open loop control system, the acceleration is proportional to the spring extension, whereas in a closed loop control system the acceleration is proportional to the spring force. Alternatively, the pendulum is coupled with the base via a servo control system to stabilize the pendulum. The acceleration is proportional to the current drawn by a servo motor of the servo control system. An inclinometer is a device which measures the inclination (i.e., absolute angular deviation) relative to a horizontal plane.

The term "bandwidth" at a certain value herein below, with respect to an angular movement detector, refers to the capability of the angular movement detector to detect angular movements at frequencies between zero and that certain value. For example, a bandwidth of 1000 Hz refers to a range of frequencies between zero Hz and 1000 Hz, at which the angular movement detector can detect angular movements.

The term "spontaneously generated noise" herein below, refers to the spontaneous noise generated by the various elements of the angular movement detector, no matter if the angular movement detector is detecting any movement or not. The spontaneously generated noise can be generated for example, due to spontaneous emissions of dopants of an optical fiber (in case of IFOG), electrostatic charges (in case of a MEMS detector), or the servo control system (in case of RIG or DTG). The spontaneously generated noise can be for example, a calibration instability factor, temperature dependent parameter, mounting misalignment on the gimbals, angle random walk, bias instability, rate random walk, rate ramp, random drift, quantization noise, correlated noise, sinusoidal noise, and the like. The spontaneously generated noise can be analyzed for example, according to the Allan Variance method which is described for example, in a draft of IEEE specification format guide and test procedure for interferometric single-axis fiber-optic gyros, entitled "Annex C An Overview of the Allan Variance Method of IFOG Noise Analysis (Informative)", 1995.

The term "vehicle" herein below, refers to a flying vehicle (e.g., airplane, helicopter, amphibian, balloon, glider, unmanned aircraft, unmanned aerial vehicle, rocket, guided missile, spacecraft, spaceship, satellite), a ground vehicle (e.g., automobile, cargo vehicle, bus, bicycle, motorcycle, tank, rail vehicle, armored vehicle, snowmobile), marine vehicle (e.g., cargo vessel, resort ship, aircraft carrier, battle ship, submarine, motor boat, sailing boat, hovercraft). The image detector can be mounted to a vehicle, an observation post (e.g., air traffic control tower, rigid mast, telescopic mast), a portable device (e.g., hand-held, wearable unit, head-mounted), and the like.

The term "disturbance" herein below, refers to physical waveforms originating from a source external to the image detector, which tend to move the image detector, thereby distorting the image detected by the image detector. The source of the disturbance can be for example, wind, ocean waves, thermal gradients, acoustic waves, seismic waves, a heavy duty ground vehicle (e.g., truck, rail vehicle) traveling close by, aerodynamic forces (e.g., wing vibrations of an aircraft, rotor vibrations of a helicopter, vibrations of a flying missile), road non-uniformity (in case of a ground vehicle), hydrodynamic forces (in case of a marine vehicle), muscular forces (in case of a hand-held image detector, either in a stationary posture or while moving on feet), powerplant of a vehicle (e.g., internal combustion engine, jet engine, electric motor), cryogenic pump of a night vision system, power transmission of a vehicle (e.g., gear train, belt drive, shafts, bearings, couplings), drilling machine, turning machine, milling machine, machine gun, and the like.

The angular movement detection device is firmly mechanically coupled with the image detector, and the image detector is firmly mechanically coupled with gimbals. In this manner, the image detector rotates together with the gimbals and disturbances are transmitted to the image detector through the gimbals. The angular movement detection device detects the movements of the image detector. The gimbals can be stabilized against some of the disturbances (substantially large amplitude disturbances), by methods known in the art, while other disturbances reach the image detector. The term "residual disturbances" herein below, refer to those disturbances which reach the image detector, after stabilizing the gimbals.

The bandwidth of each angular movement detector is greater than the frequency of disturbances, preferably by one order of magnitude. For example, if the residual disturbances are between 0.2 and 80 Hz, then a preferable bandwidth of the angular movement detector would be at least 1000 Hz. The detection range of angular movement rates by the angular movement detector is greater than the range of angular movement rates of the image detector due to residual disturbances. For example, if the image detector rotates at a rate of between 2 to 4 degrees per second, then the angular movement detector can detect angular movements within a range of 10 to 20 degrees per second.

One or more attributes of the angular movement detector, such as the precision, sensitivity, repeatability, resolution, and the like, is better than those specified for stabilizing the detected image. For example, if the disturbances cause the image detector to rotate by five microradians, then the angular movement detector has to be able to detect angular movements with an accuracy of at least one microradian. The angular movement detector can detect rotations of the image detector at substantially small values, as well as those of the gimbals, at substantially large values. Likewise, the angular movement detector detects angular velocities with an accuracy greater than those caused by the disturbances (preferably an order of magnitude). The spontaneously generated noise is substantially small and the resolution of the angular movement detector is substantially large. For example, if the disturbances at the image detector are at an amplitude of 100-300 microradians and a frequency of less than 80 Hz, then the angular movement detector has to detect disturbances with an accuracy of 5 microradians and standard deviation of 1σ or better.

The bandwidth of an RG is limited to between 100 to 200 Hz. However, the bandwidth of either IFOG or RLG is 1000 Hz or greater.

The term "control signal" herein below, refers to all signals except the disturbances which are meant to control the position of the image detector, in order to track a target. The control signal can be a command signal received from the user of the image detector, a directional stabilizing signal received from a directional stabilizer for stabilizing the image detector against either the pitch, yaw, roll (or a combination thereof) of the vehicle, a scene tracking signal for tracking the scene, a target tracking signal for locking on to the target, and the like.

Figure 2A:
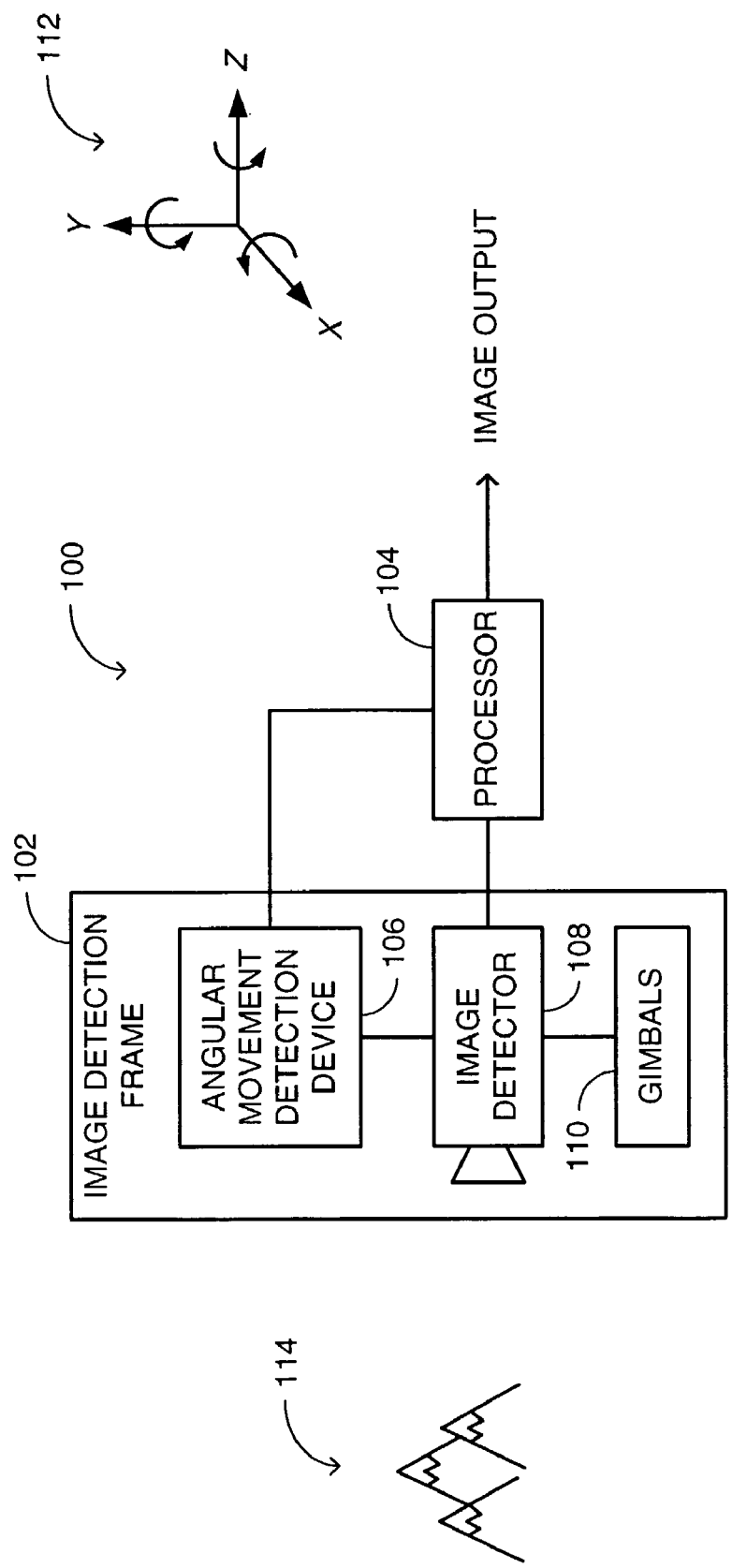
FIG. 2A is a schematic illustration of a system, for stabilizing an image of a scene detected by an image detector subjected to disturbances, constructed and operative in accordance with an embodiment of the disclosed technique.
Figure 2B:
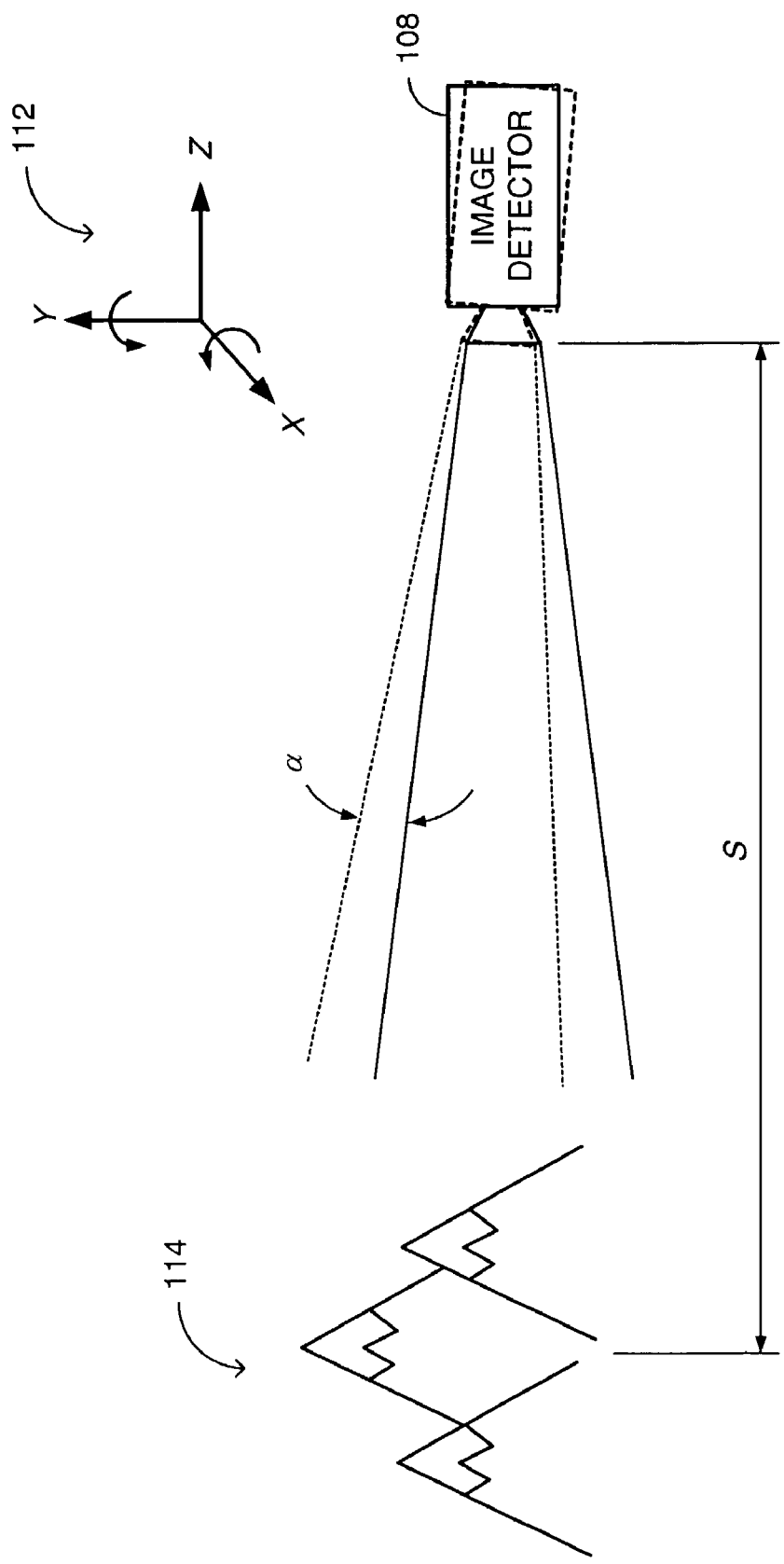
FIG. 2B is a schematic illustration of a pitch motion of the image detector of the system of FIG. 2A, due to a disturbance.
Figure 2C:
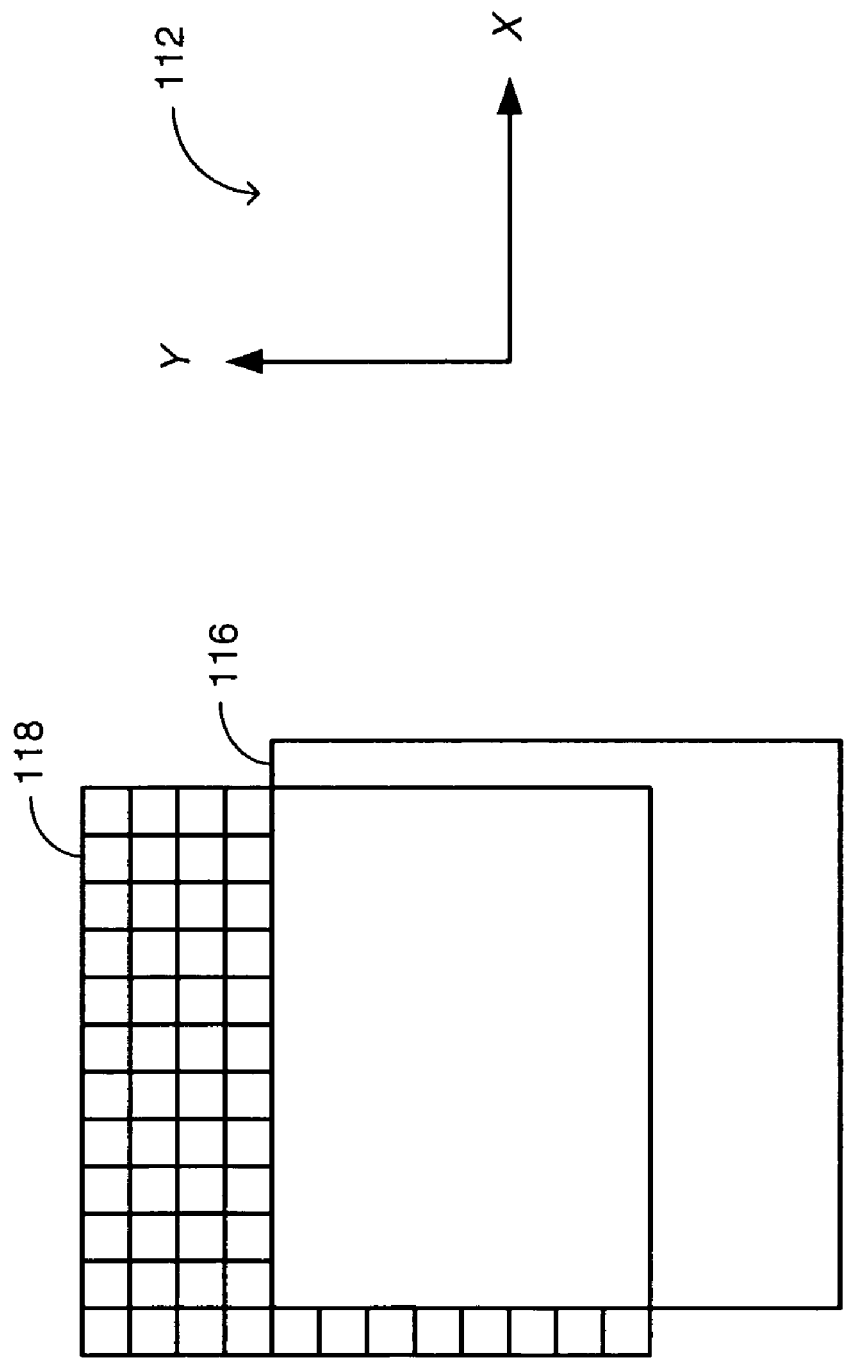
FIG. 2C is a schematic illustration of an image of the scene of FIG. 2A, shifted by the processor of the system of FIG. 2A, in directions opposite to the pitch and yaw of the image detector illustrated in FIG. 2B, and by displacements proportional to the pitch and yaw of the image detector.
Figure 2F:
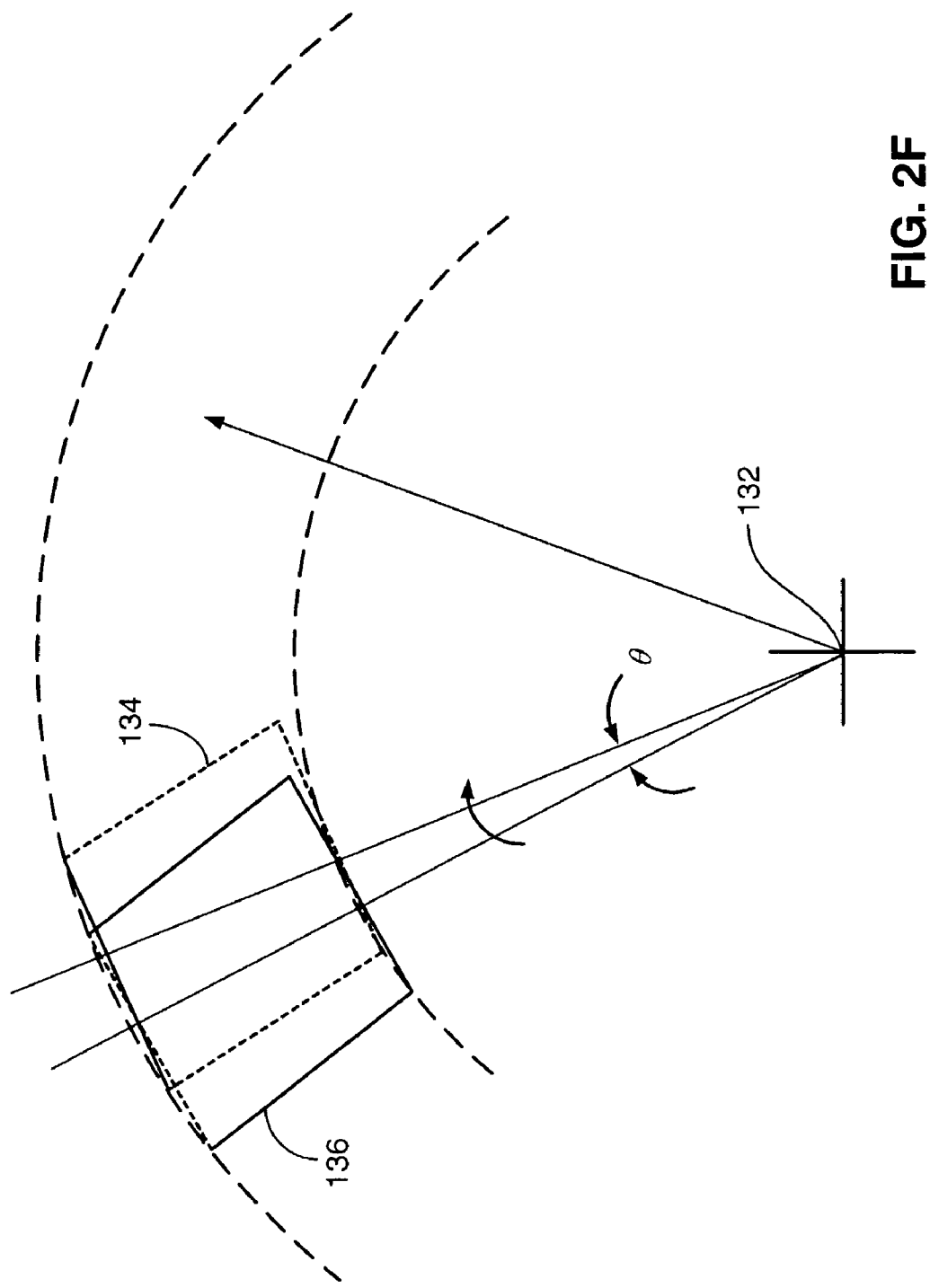
FIG. 2F is a schematic illustration of displacement of the current image of a scene detected by the image detector of the system of FIG. 2A, relative to a reference image of the scene, due to rotation of the image detector about an axis of rotation of the gimbals of the system.

Reference is now made to FIGS. 2A, 2B, 2C, 2D, 2E, and 2F. FIG. 2A is a schematic illustration of a system, generally referenced 100, for stabilizing an image of a scene detected by an image detector subjected to disturbances, constructed and operative in accordance with an embodiment of the disclosed technique. FIG. 2B is a schematic illustration of a pitch motion of the image detector of the system of FIG. 2A, due to a disturbance. FIG. 2C is a schematic illustration of an image of the scene of FIG. 2A, shifted by the processor of the system of FIG. 2A, in directions opposite to the pitch and yaw of the image detector illustrated in FIG. 2B, and by displacements proportional to the pitch and yaw of the image detector. FIG. 2D is a schematic illustration of a roll motion of the image detector of FIG. 2A about an axis of rotation thereof, due to a disturbance. FIG. 2E is a schematic illustration of an image of the scene of FIG. 2A, shifted by the processor of the system of FIG. 2A, in a direction opposite to the roll of the image detector illustrated in FIG. 2D, and by a displacement proportional to the roll of the image detector. FIG. 2F is a schematic illustration of displacement of the current image of a scene detected by the image detector of the system of FIG. 2A, relative to a reference image of the scene, due to rotation of the image detector about an axis of rotation of the gimbals of the system.

With reference to FIG. 2A, system 100 includes an image detection frame 102 and a processor 104. Image detection frame 102 includes an angular movement detection device 106, an image detector 108 and gimbals 110. The sampling rate of processor 104 is greater than the detection frequency of angular movement detection device 106. Image detection frame 102 is firmly mechanically coupled with a vehicle. Alternatively, image detection frame 102 is firmly mechanically coupled with an observation post (not shown). Further alternatively, image detection frame 102 is firmly mechanically coupled with a portable device.

Gimbals 110 has three DOFs and can move about the X, Y and Z axes of a three-dimensional coordinate system such as Cartesian coordinate system 112. Alternatively, gimbals 110 has two DOFs and can move about only two of the axes of the coordinate system. Further alternatively, gimbals 110 has one DOF and can move about only one of the axes of the coordinate system. Gimbals 110 can be electromechanically stabilized against disturbances, by methods known in the art. An angular movement detection device (not shown), less precise and less sensitive than angular movement detection device 106, can be employed to stabilize gimbals 110 against substantially large amplitude disturbances.

Residual disturbances reach image detector 108, thereby causing image detector 108 to rotate about the X, Y and Z axes. Gimbals 110 is firmly mechanically coupled with image detection frame 102. Image detector 108 is firmly mechanically coupled with gimbals 110, thereby freely rotating about the X, Y and Z axes of coordinate system 112 (i.e., having pitch, yaw and roll motions, respectively). Angular movement detection device 106 is firmly mechanically coupled with image detector 108, thereby detecting the pitch, yaw and roll motions of image detector 108. Processor 104 is electronically coupled with angular movement detection device 106 and with image detector 108.

Image detector 108 detects images (not shown) of a scene 114. According to the characteristics of an optical assembly (not shown) associated with image detector 108, rotation of image detector 108 about any of the X, Y and Z axes by a certain angle, corresponds to a predetermined displacement (e.g., pixel, portion of a pixel) of the image detected by a sensor (not shown—e.g., CCD, CMOS) of image detector 108.

With reference to FIG. 2B, due to disturbances, image detector 108 rotates about the X axis by an angle α (i.e., a pitch motion) at an angular velocity $\omega_1$ and an angular acceleration $\omega'_1$, and about the Y axis by an angle β (not shown—i.e., a yaw motion) at an angular velocity $\omega_2$ and at an angular acceleration $\omega'_2$. Image detector 108 sends video signals respective of the detected images to processor 104. Angular movement detection device 106 detects angular velocities $\omega_1$ and $\omega_2$, and angular accelerations $\omega'_1$ and $\omega'_2$, and outputs respective velocity and acceleration signals to processor 104. It is possible for angular movement detection device 106 to detect only angular values, only angular velocities, only angular accelerations, or a combination thereof. Preferably, angular movement detection device 106 detects either angular values or angular velocities. In case angular movement detection device 106 detects angular velocities or angular accelerations, processor 104 determines the angles α and β by integrating either the angular velocity or the angular acceleration.

Prior to operation of system 100, system 100 is calibrated by synchronizing processor 104 with angular movement detection device 106 spatially and temporally. System 100 is calibrated specifically for the scene whose detected image is to be stabilized. For calibrating system 100 spatially, image detector 108 detects a first image 116 (FIG. 2C—i.e., reference image) of scene 114. For example, image detector 108 can detect reference image 116 after a user (not shown) has directed image detection frame 102 toward scene 114, and once the user activates system 100 (e.g., by throwing a switch).

Processor 104 stores reference image 116 in a memory (not shown), together with a reference angular output of angular movement detection device 106, at substantially the same time that reference image 116 is detected (i.e., reference status). Processor 104 stores the reference angular output relative to coordinate system 112 (i.e., processor 104 associates the reference angular output with the reference image 116). For example, reference image 116 corresponds to zenith (i.e., pitch) of 5 degrees North, and azimuth (i.e., yaw) of 200 degrees West. The reference status is the time when the user activates system 100 (e.g., via a switch).

Since a finite time is needed for processor 104 to produce an image according to the video signal received from image detector 108, the current angular output of angular movement detection device 106 does not necessarily match the correct image produced by processor 104. Thus, it is crucial to temporally synchronize processor 104 with angular movement detection device 106, in order for processor 104 to take into account this processing time lag, and to match the current angular output of angular movement detection device 106 with the relevant image detected by image detector 108. Processor 104 can take into account the time lag by counting a corresponding number of clock cycles.

In this manner, processor 104 associates the current angular output with the respective detected image (i.e., a current image 118—FIG. 2C). Processor 104 takes into account the processing time lag also for associating the reference angular output with the reference image 116.

Processor 104 compares the current angular output of angular movement detection device 106 associated with current image 118, with the reference angular output, and determines the number of pixels which current image 118 has to be shifted. Based on the characteristics of the optical assembly associated with image detector 108, every rotation of image detector 108 (e.g., a pitch of $\alpha$—FIG. 2B) corresponds to a predetermined linear shift (i.e., pixels) of the detected image. Processor 104 determines the number of pixels and the directions thereof, by which current image 118 has to be shifted, according to the difference between the current angular output and the reference angular output.

With reference to FIG. 2C, as a result of the disturbance and the pitch and yaw of image detector 108 by angles $\alpha$ and $\beta$, respectively, current image 118 shifts along the Y axis and the X axis, respectively, relative to reference image 116. For example, if $\alpha$=5.01 degrees North (i.e., pitch of 0.01 degrees North relative to the reference image), then processor 104 determines that current image 118 has shifted by one hundred pixels along the positive Y axis. If $\beta$=200.025 degrees West (i.e., yaw of 0.025 degrees West), then processor 104 determines that current image 118 has shifted by two hundred and fifty pixels along the negative X axis.

By employing image processing techniques known in the art, processor 104 shifts the current image 118 in directions opposite to the pitch and yaw of image detector 108, relative to reference image 116, according to the current example—by four pixels along the negative Y-axis and by one pixel along the positive X axis. The processor produces an image output (not shown) for example, to a display (not shown), a memory (not shown), or a communication interface (not shown), coupled with the processor, thereby stabilizing the images detected by the image detector, despite the disturbances which act on the image detector. If these shifts are not taken into account while reproducing the images detected by the image detector, the displayed image would be distorted.

With reference to FIG. 2D, image detector 108 rotates counterclockwise about a longitudinal axis 120 thereof, by an angle $\gamma$ (i.e., a roll motion) at an angular velocity $\omega_3$ and an angular acceleration $\omega'_3$. Longitudinal axis 120 is substantially parallel with the Z axis, and is located on one of the axes of rotation (not shown) of gimbals 170. With reference to FIG. 2E, processor 104 determines that a current image 122 detected by image detector 108 has rotated counterclockwise by the angle $\gamma$ about longitudinal axis 120, relative to a reference image 124. Processor 104 shifts each pixel of the current image 122 along the X and Y axes, by shifting displacements determined according to the product of a radius (not shown) of the pixel from a center 126 and the angle $\gamma$ pointing clockwise from the radius. Center 126 is located on longitudinal axis 120 and substantially at the center of current image 122.

Due to the pixel shift performed by processor 104, some portions 128 of the current image 122 at corners of current image 122 can fall outside the perimeter of reference image 124. Therefore, in order to reduce ambiguity in the image, processor 104 produces a final image 130 whose boundary is common to both the current image 122 and reference image 124 (e.g., a circle within both the current image 122 and reference image 124).

With reference to FIG. 2F, the longitudinal axis (not shown) of the image detector (not shown) is located at a radius r from the axis of rotation (not shown) of the gimbals (not shown). The axis of rotation of the gimbals is represented in FIG. 2F, by a center point 132. Due to the disturbances, a current image 134 of a scene (not shown) rotates clockwise by an angle $\theta$ about center point 132 at radius r, relative to a reference image 136 of the scene. In order to stabilize the detected image of the scene, a processor similar to processor 104 (FIG. 2A), shifts the pixels (not shown) of current image 134 by taking into account the radius r, the angle $\theta$ and the direction of rotation.

It is noted that system 100 is capable to stabilize an image especially when the SNR of the optical signal reaching image detector 108 is substantially low (e.g., in a dark environment where system 100 is used as a night vision apparatus). This is due to the fact that one or more of the attributes of angular movement detection device 106, such as the precision, sensitivity, repeatability, resolution, and the like, is better than the range of angular displacements of image detector 108 caused by disturbances, by at least one order of magnitude. Due to specific attributes of angular movement detection device 106, and the way the images are shifted by processor 104, system 100 is able to stabilize images with precision of less than one pixel, even at low SNR situations (e.g., an SNR of 1 dB).

Optionally, system 100 can further include a range finder (not shown) coupled with the processor. The range finder determines the current distance between the image detector and the scene.

The processor zooms the detected image in or out (i.e., modifies the magnification of the detected image), according to the output of the range finder.

Alternatively, the processor shifts the current image relative to the image detected immediately before (i.e., the previous image) the current image.

In this case, the processor compares the current angular output of the angular movement detection device, with the previous angular output corresponding with the previous image, determines the respective pixel shift and shifts the current image accordingly.

System 100 can be incorporated with an optical assembly, such as microscope, binoculars, head-up display, head-mounted display, night vision system, telescope, periscope, light amplifier such as a starlight scope (SLS), a combination thereof, and the like.

System 100 can be calibrated according to an output of angular movement detection device 106 corresponding to a substantially blur-free image which is stabilized at a predetermined accuracy measured in units of radians.

According to another aspect of the disclosed technique, an angular movement filter substantially filters out spontaneously generated noise and control signals, and substantially outputs only those signals which correspond with the disturbances acting on the image detector. In this manner, the system is able to stabilize the detected image only against movements which are due to the disturbances, and ignore all others.

Figure 3:
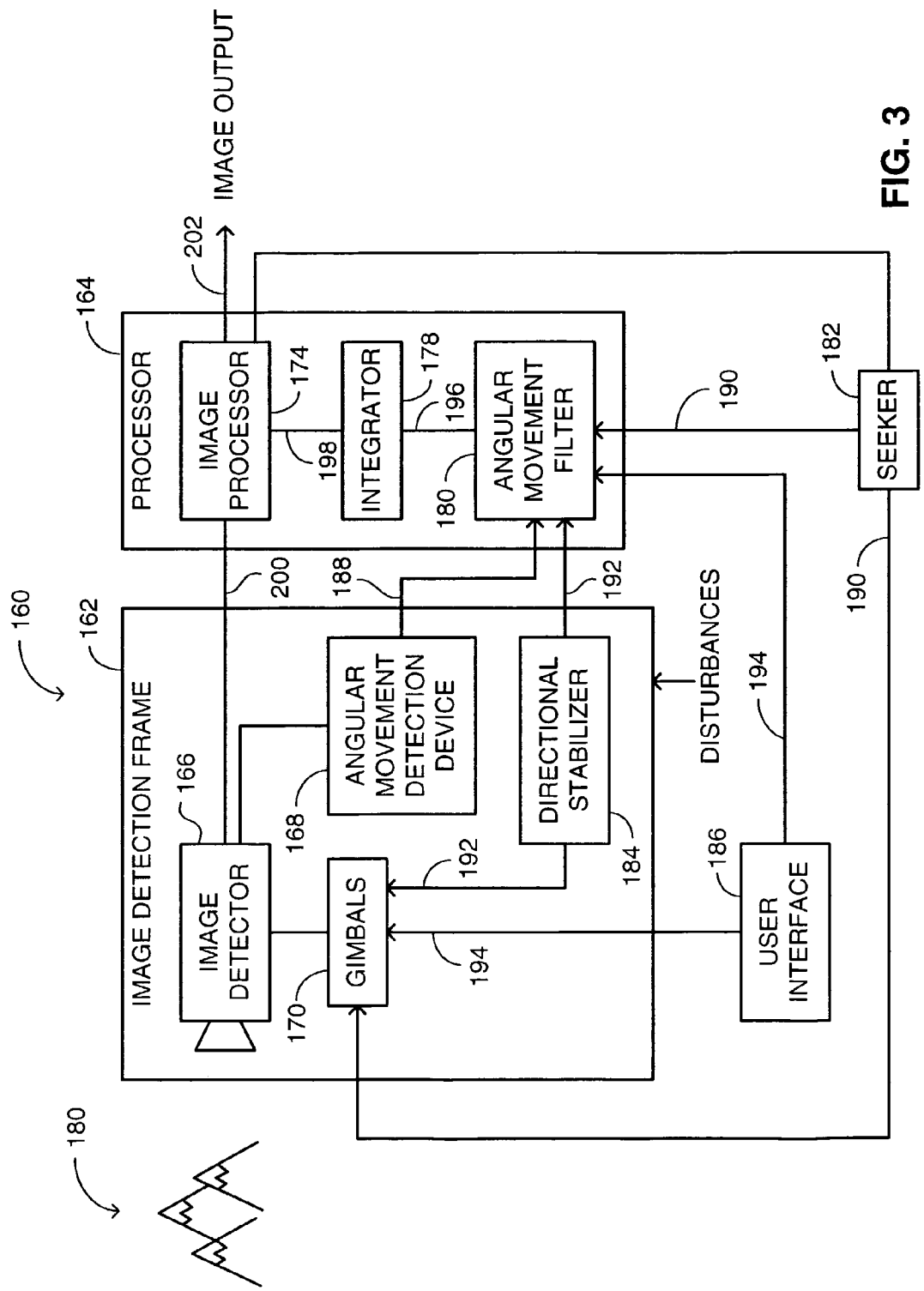
FIG. 3 is a schematic illustration of a system, for stabilizing an image of a scene detected by an image detector subjected to disturbances and control signals, constructed and operative in accordance with another embodiment of the disclosed technique.

Reference is now made to FIG. 3, which is a schematic illustration of a system, generally referenced 160, for stabilizing an image of a scene detected by an image detector subjected to disturbances and control signals, constructed and operative in accordance with another embodiment of the disclosed technique. System 160 includes an image detection frame 162, and a processor 164. Image detection frame 162 includes an image detector 166, an angular movement detection device 168, and gimbals 170. Processor 164 includes an image processor 174, an integrator 178 and an angular movement filter 180. Processor 164 is similar to processor 104 (FIG. 2A). Image detector 166 detects an image of a scene 180.

Integrator 178 is a module which performs a mathematical integration operation on an input thereto (i.e., performing a mathematical operation opposite to differentiation). Angular movement filter 180 is a module which filters out spontaneously generated noise and control signal components from an input thereto. A seeker 182 can be coupled with gimbals 170, image processor 174 and with angular movement filter 180. Seeker 182 can include either a scene tracker (not shown), a target tracker (not shown), or a combination thereof. A scene tracker is a module which identifies one or more landmarks in an image (not shown) of scene 180, and detects movement of the landmarks within the image, due to the movement of a vehicle (not shown), an observation post (not shown), or a portable device (not shown).

The scene tracker directs the servo system (not shown) of gimbals 170 to move image detector 166 according to the detected movement, such that image detector 166 maintains a fixed line of sight (LOS) with respect to scene 180.

A target tracker is a module which identifies a target (not shown) by employing image processing techniques known in the art, and directs the servo system of gimbals 170 to move image detector 166, such that image detector 166 substantially tracks the target. In this case, there is relative motion between the target and image detector 166 (i.e., the target is moving, image detector 166 is moving, or both the target and image detector 166 are moving). The system can further include an enslaving device (not shown) for moving the gimbals toward a certain direction. A directional stabilizer 184 can be firmly mechanically coupled with gimbals 170 (therefore with image detector 166) and electrically with angular movement filter 180. Directional stabilizer 184 is a module which stabilizes image detector 166 against the pitch, yaw and roll motions of image detector 166.

Alternatively, directional stabilizer 184 is a module which stabilizes image detector 166 against the pitch, yaw and roll motions of image detector 166 firmly mechanically coupled with the observation post. Further alternatively, directional stabilizer 184 is a module which stabilizes image detector 166 against the pitch, yaw and roll motions of image detector 166 firmly mechanically coupled with the portable device. Directional stabilizer 184 generally includes an angular movement detection device (not shown) to detect the pitch, yaw and roll of the vehicle, and a processor (not shown) to produce a directional corrective signal for stabilizing image detector 166.

A user interface 186 can be coupled with gimbals 170 and with angular movement filter 180. User interface 186 is a joystick, a coordinate input device, and the like. A user (not shown) of the vehicle or the observation post can input a user command to user interface 186, in order to change the LOS of image detector 166.

Image detector 166 is coupled with angular movement detection device 168, gimbals 170 and with image processor 174. Integrator 178 is coupled with image processor 174 and with angular movement filter 180. Angular movement filter 180 is coupled with angular movement detection device 168.

Image detection frame 162 is subject to disturbances. Angular movement detection device 168 sends a signal 188 respective of the detected disturbances to angular movement filter 180. Signal 188 includes the spontaneously generated noise. Angular movement filter 180 filters out the spontaneously generated noise from signal 188, as described herein below in connection with FIG. 4.

Seeker 182 processes an image (not shown) of scene 180 and of the moving target moving with scene 180, according to a signal received from image processor 174. Seeker 182 produces a signal 190 for moving gimbals 170, such that image detector 166 tracks the moving target within scene 180 (which is already tracked by the scene tracker). Seeker 182 sends signal 190 also to angular movement filter 180.

Directional stabilizer 184 detects the pitch, yaw and roll of the vehicle, and produces a signal 192 of an amplitude proportional to the movements of the vehicle and in an opposite direction, to move image detector 166 in order to stabilize image detector 166 against the movements of the vehicle. Directional stabilizer 184 sends signal 192 to the servo system of gimbals 170 and to angular movement filter 180.

Since gimbals 170 move image detector 166 to track the moving target after moving image detector 166 to track scene 180, the corrective target tracking movements (represented by signal 192) are generally finer than the corrective scene tracking movements (represented by signal 190). Likewise, the corrective scene tracking movements (represented by signal 190) are generally finer than the corrective directional movements (represented by signal 192).

User interface 186 produces a movement command signal 194 to move image detector 166 to a desired orientation. The user interface sends signal 194 to the servo system of gimbals 170 and to angular movement filter 180. The frequency of signal 194 is generally less than that of the disturbances.

Since image detector 166 is subjected to movements due to the disturbances as well as the ones due to signals 190, 192 and 194, signal 188 includes components due to outputs of seeker 182, directional stabilizer 184 and user interface 186, as well as the spontaneously generated noise. Angular movement filter 180 filters out those components respective of signals 190, 192 and 194, as well as the spontaneously generated noise, from signal 188 and produces a signal 196 for integrator 178, which is substantially free of the user command signals and the spontaneously generated noise. Signal 196 can be either a velocity signal or an acceleration signal. Integrator 178 integrates signal 196 (either once or twice, depending on the units of signal 196), to produce a current angular output 198 for image processor 174.

Image processor 174 receives a video signal 200 from image detector 166, respective of the current image (not shown) detected by image detector 166. Image processor 174 compares the current angular output 198 with the reference angular output (as described herein above in connection with FIG. 2A), determines the number of pixels and the shifting directions thereof to shift the current image, shifts the current image by that amount, and produces a signal 202 respective of a stabilized image of scene 180. In case signal 196 is respective of an angular value, integrator 178 can be eliminated.

Figure 4:
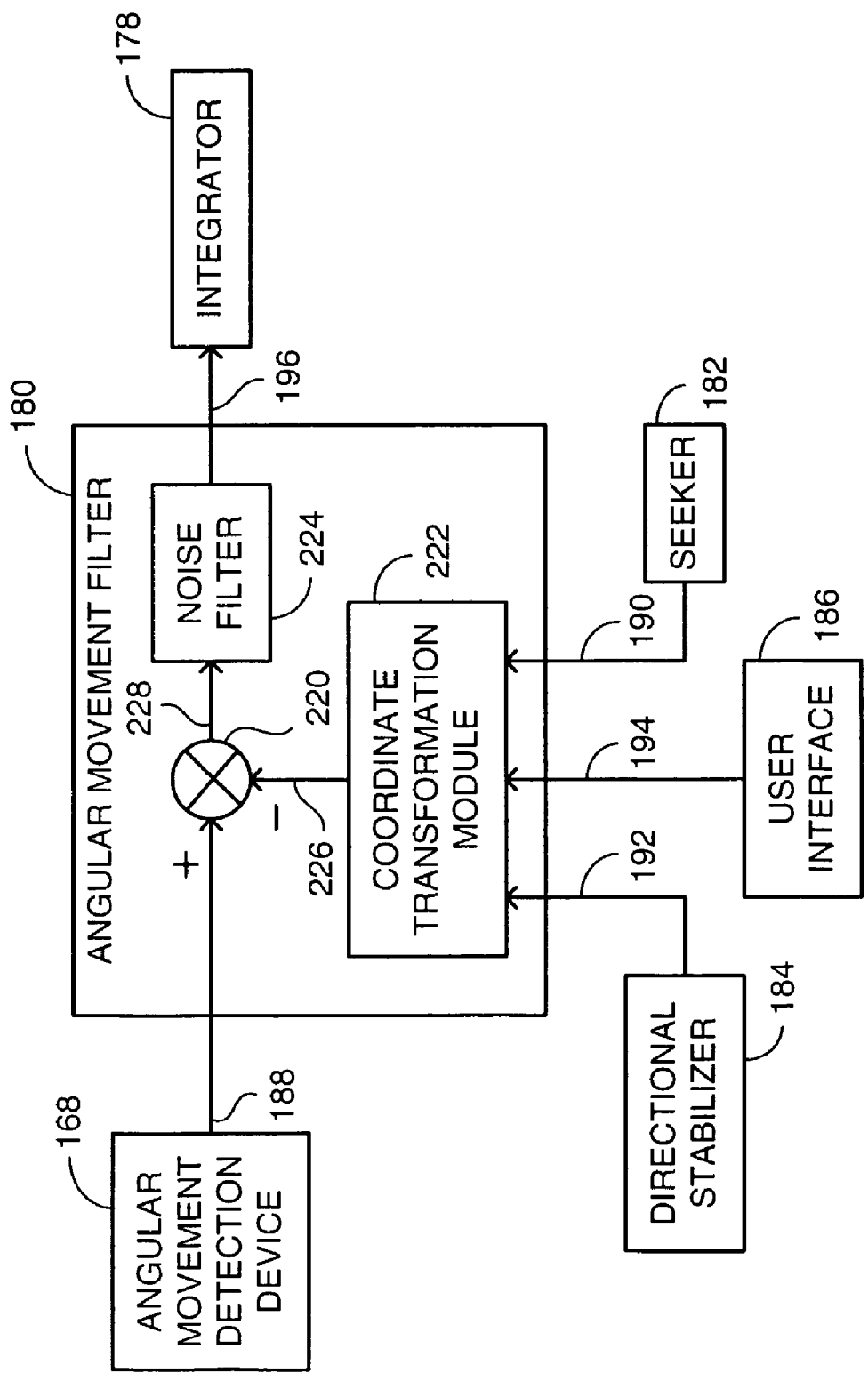
FIG. 4 is a schematic illustration of the angular movement filter of the processor of the system of FIG. 3.

Reference is further made to FIG. 4, which is a schematic illustration of the angular movement filter of the processor of the system of FIG. 3. Angular movement filter 180 includes a summing element 220, a coordinate transformation module 222, and a noise filter 224. Summing element 220 is coupled with angular movement detection device 168, coordinate transformation module 222 and with noise filter 224. Coordinate transformation module 222 is coupled with seeker 182, directional stabilizer 184 and with user interface 186. Noise filter 224 is coupled with integrator 178.

Coordinate transformation module 222 is a module which defines the transfer function of gimbals 170. This transfer function represents the mechanical response of gimbals 170 to control signals, such as the signals produced by the scene tracker, the target tracker, and directional stabilizer 184 to stabilize the detected image, or a movement command signal generated by user interface 186 to change the LOS of image detector 166. This transfer function is based, inter alia, on Euler equations, quaternion equations, and the like, which are constructed according to values measured at the servo system of gimbals 170 in a calibration phase, prior to field operation of system 160. Thus, coordinate transformation module 222 transforms the control signals from the coordinate systems of different devices, such as the scene tracker, the target tracker, directional stabilizer 184, and user interface 186, to the coordinate system of gimbals 170.

Noise filter 224 can be a Kalman filter, extended Kalman filter, unscented Kalman filter, a recursive least square algorithm, interacting multiple model (IMM) filter, and the like. Noise filter 224 estimates the spontaneously generated noise (described herein above) which are an inherent part of angular movement detection device 168, and filters out this estimated spontaneously generated noise. For this purpose, noise filter 224 includes a model of the spontaneously generated noise.

Coordinate transformation module 222 receives signals 190, 192 and 194, and outputs a signal 226 to summing element 220. Signal 226 represents the substantially real response of gimbals 170 to the control signals. Summing element 220 subtracts signal 226 from signal 188, thereby producing a signal 228 which represents the movements of image detector 166 due to the disturbances and spontaneously generated noise of angular movement detection device 168, substantially free of the control signals. Noise filter 224 filters out the spontaneously generated noise of angular movement detection device 168 from signal 228, and outputs signal 196 which is substantially free of the control signals and the spontaneously generated noise, and substantially represents the movements of image detector 166, only due to the disturbances.

Figure 5:
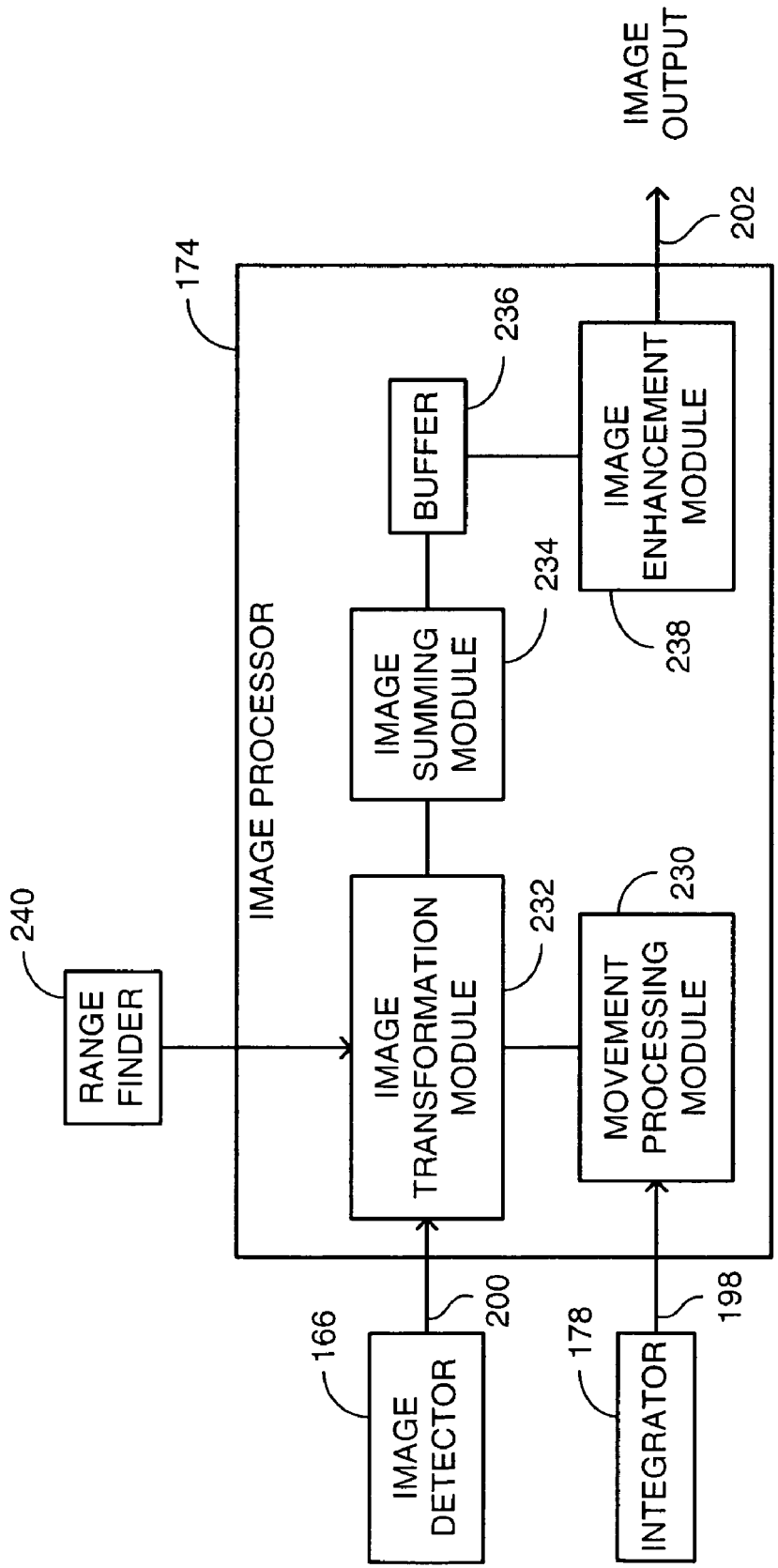
FIG. 5 is a schematic illustration of the image processor of the processor of the system of FIG. 3.

Reference is further made to FIG. 5, which is a schematic illustration of the image processor of the processor of the system of FIG. 3. Image processor 174 includes a movement processing module 230, an image transformation module 232, an image summing module 234, a buffer 236 and an image enhancement module 238. Movement processing module 230 is coupled with integrator 178 and with image transformation module 232. Image transformation module 232 is coupled with image detector 166, with an optional range finder 240 I am not sure we need it, and with image summing module 234. Buffer 236 is coupled with image summing module 234 and with image enhancement module 238.

Movement processing module 230 receives the current angular output 198 from integrator 178, and image transformation module 232 processes video signal 200 received from image detector 166, to produce the current image. Current angular output 198 includes information respective of the pitch and yaw of image detector 166, as well as roll about longitudinal axis 120 (FIG. 2D) of image detector 166, or about center point 132 (FIG. 2F). Movement processing module 230 compares the current angular output 198 with the reference angular output (as described herein above in connection with FIG. 2C), and determines the number of pixels which the current image has to be shifted, and the directions thereof. Movement processing module 230 can determine the number of pixel shifts and directions thereof, also for a roll, as described herein above in connection with FIGS. 2D, 2E, and 2F.

Due to the processing time expended by image transformation module 232, current angular output 198 does not necessarily match the correct image detected by image detector 166. Image transformation module 232 takes into account this time lag, in order to match the pixel shift with the correct image, and shifts the correct image by the number of pixels and in the directions determined by movement processing module 230.

Optionally, image transformation module 232 may also modify the scale of the current image, i/e/: (i.e., zoom in or zoom out), according to the current distance between image detector 166 and scene 180 (FIG. 3), as determined by optional range finder 240, thereby compensating for the approaching or receding movements of a vehicle relative to scene 180. Image transformation module 232 operates in sub-pixel accuracy by bilinear interpolation.

Image summing module 234 adds together a predetermined number of images according to the output of image transformation module 232. Image summing module 234 is indispensable in cases where the image SNR is substantially low, such as a gated camera. Buffer 236 accumulates a plurality of images received from image summing module 234, and outputs images to a device (e.g., display, memory, communication interface—not shown), at a regulated rate which is suitable for operation of the device. Furthermore, buffer 236 can be applied to reduce the frame rate for a suitable operation of the device. For example, if the device is a display (not shown) which displays an image at 30 frames per second, and image detector 166 detects images at 120 frames per second, buffer 236 reduces the frame rate to 30 frames per second (by eliminating, summing or averaging frames), which is suitable for the operation of the display.

Image enhancement module 238 is employed to improve the quality of the images according to an input from a user interface (not shown), an optical sensor, and the like. For example, a user can adjust the brightness and contrast of the image displayed by the display, by employing image enhancement module 238.

Figure 6:
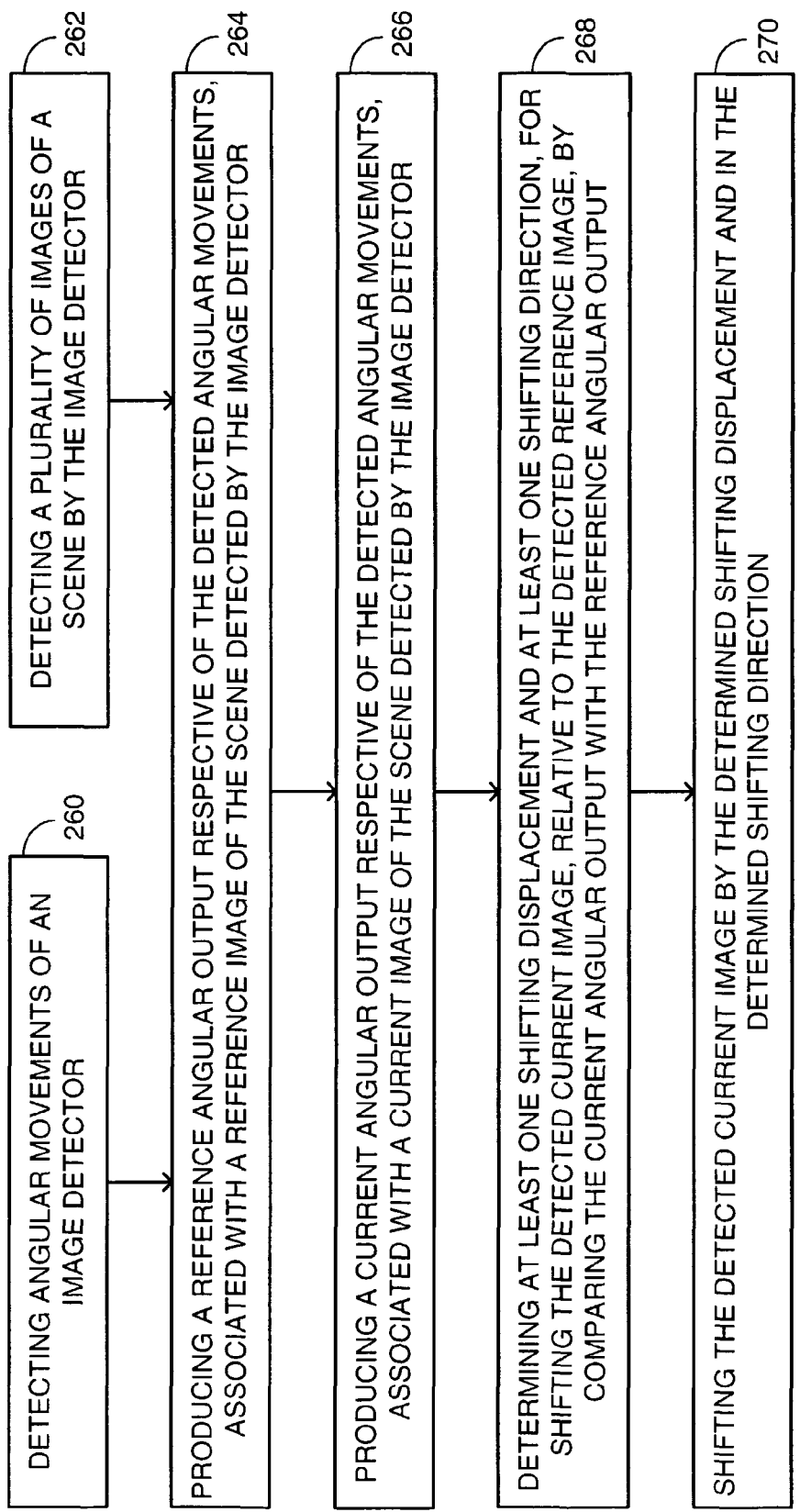
FIG. 6 is a schematic illustration of a method for operating the system of FIG. 2A, operative in accordance with a further embodiment of the disclosed technique.

Reference is now made to FIG. 6, which is a schematic illustration of a method for operating the system of FIG. 2A, operative in accordance with a further embodiment of the disclosed technique. In procedure 260, angular movements of an image detector are detected. With reference to FIG. 2A, angular movement detection device 106 detects angular movements of image detector 108, about any of the X, Y or Z axes. Image detector 108 rotates about longitudinal axis 120 (FIG. 2D), which is the longitudinal axis of image detector 108. Alternatively, image detector 108 rotates about an axis of rotation of gimbals 110 (FIG. 2A), represented by center point 132 (FIG. 2F).

In procedure 262, a plurality of images of a scene, are detected by the image detector. With reference to FIG. 2A, image detector 108 detects images of scene 114. Procedures 260 and 262 are performed simultaneously.

In procedure 264, a reference angular output respective of the detected angular movements is produced, wherein the reference angular output is associated with a reference image of the scene detected by the image detector. With reference to FIGS. 2A and 2C, image detector 108 detects reference image 116 of scene 114 and sends a respective video signal to processor 104. Angular movement detection device 106 constantly inputs angular outputs respective of the detected angular movements of image detector 108, to processor 104. Processor 104 associates an angular output (i.e., a reference angular output), with the first image (i.e., reference image 116) of scene 114 detected by image detector 108, once the user activates system 100. Processor 104 takes into account a processing time lag for associating the reference angular output with reference image 116.

In procedure 266, a current angular output respective of the detected angular movements is produced, wherein the current angular output is associated with a current image of the scene detected by the image detector. With reference to FIGS. 2A and 2C, processor 104 associates the current angular output with the current image 118, by taking into account the processing time lag.

In procedure 268, at least one shifting displacement and at least one shifting direction are determined, for shifting the detected current image, relative to the detected reference image, by comparing the current angular output with the reference angular output. As described herein above in connection with FIG. 2C, processor 104 determines according to an angular output received from angular movement detection device 106, that current image 118 has shifted by one hundred pixels along the positive Y axis and by two hundred and fifty pixels along the negative X axis (i.e., pitch and yaw, respectively), relative to reference image 116. Processor 104 determines that current image 118 has to be shifted by one hundred pixels along the negative Y axis and by two hundred and fifty pixels along the positive X axis, in order to compensate for rotations of image detector 108 about the X and Y axes, and to substantially stabilize the detected image.

In procedure 270, the detected current image is shifted by the determined shifting displacement and in the determined shifting direction. With reference to FIG. 2C, processor 104 shifts the current image 118 by one hundred pixels along the negative Y axis and by two hundred and fifty pixels along the positive X axis.

It is noted that in procedure 260, in addition to rotations of image detector 108 about the X and Y axes, rotations about the Z axis (i.e., roll) can be detected as well. With reference to FIGS. 2A and 2D, processor 104 determines that image detector 108 has rotated about longitudinal axis 120 of image detector 108, by γ degrees counterclockwise, according to the output of angular movement detection device 106. With reference to FIGS. 2A and 2F, alternatively, processor 104 determines that image detector 108 has rotated about an axis of rotation of gimbals 110 represented by center point 132, by θ degrees clockwise, according to the output of angular movement detection device 106.

In procedure 268, processor 104 determines the number of pixels and the respective directions in current image 122 (FIG. 2E), to be shifted in order to compensate for the roll about longitudinal axis 120. In procedure 270, with reference to FIGS. 2A and 2E, processor 104 shifts the pixels of current image 122, such that current image 122 shifts by γ degrees clockwise about the center 126. In procedure 270, alternatively, with reference to FIGS. 2A and 2F, processor 104 shifts the pixels of current image 134, such that current image 134 shifts by θ degrees counterclockwise, about the axis of rotation of gimbals 110, represented by center point 132.

According to another aspect of the disclosed technique, an image stabilization system employs devices known in the art for stabilizing images, as well as the devices described herein above according to the disclosed technique. For example, the system includes a processor which operates both as a correlator (for stabilizing an image by processing the image), and as a device which shifts each image according to the output of an angular movement detection device. Furthermore, the gimbals which support the image detector can be stabilized and the image detector can be stabilized according to the output of one or more gyroscopes.

Figure 7:
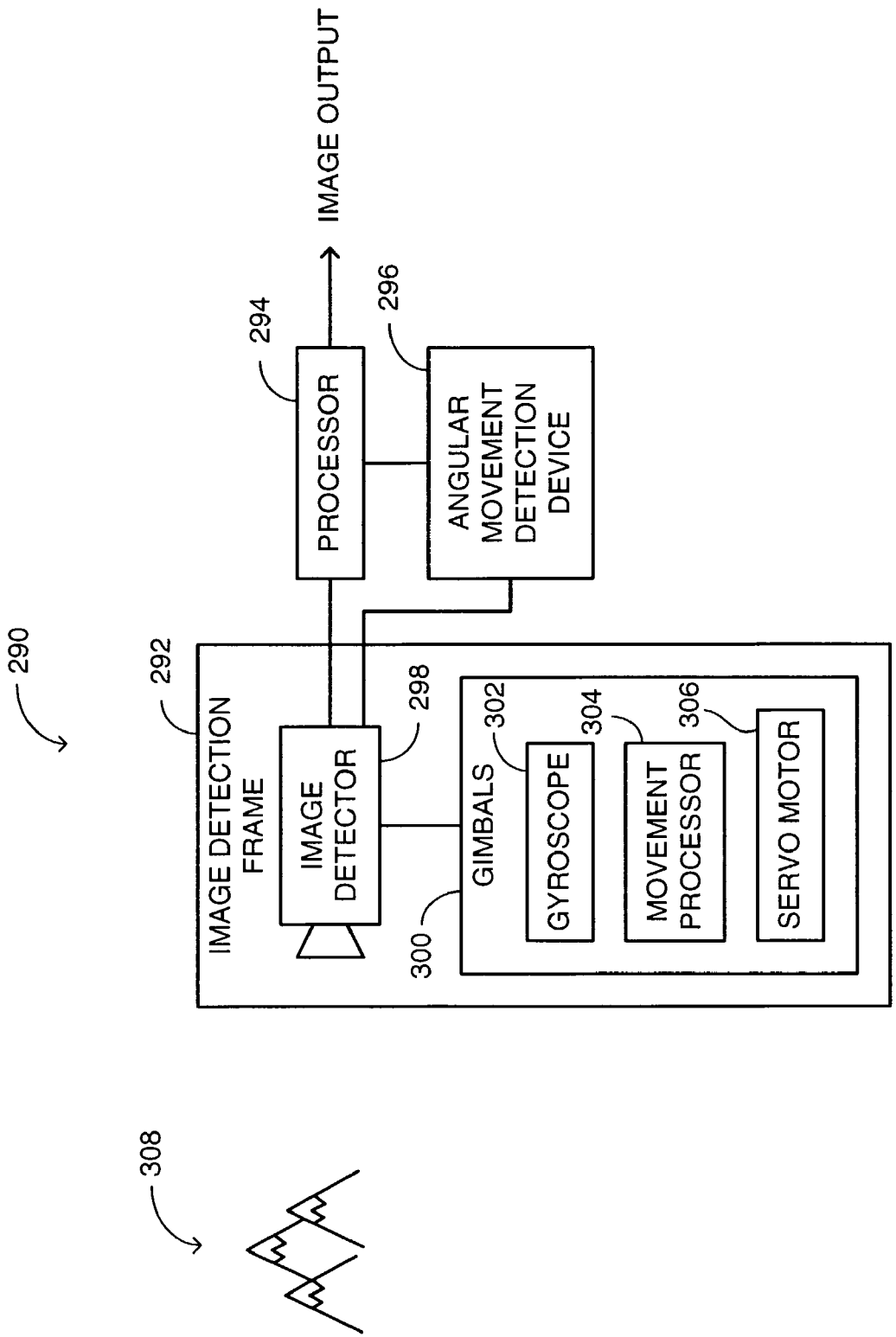
FIG. 7 is a schematic illustration of a system, for stabilizing an image of a scene detected by an image detector subjected to disturbances, constructed and operative in accordance with another embodiment of the disclosed technique.

Reference is now made to FIG. 7, which is a schematic illustration of a system, generally referenced 290, for stabilizing an image of a scene detected by an image detector subjected to disturbances, constructed and operative in accordance with another embodiment of the disclosed technique. System 290 includes an image detection frame 292, a processor 294 and an angular movement detection device 296.

Image detection frame 292 includes an image detector 298 and gimbals 300. Gimbals 300 include a gyroscope 302, a movement processor 304 and a servo motor 306.

Image detection frame 292 is firmly mechanically coupled with a vehicle (not shown), an observation post (not shown), or a portable device (not shown). Image detector 298 is firmly mechanically coupled with gimbals 300. Processor 294 is electrically coupled with image detector 298 and with angular movement detection device 296. Image detector 298 is firmly mechanically coupled with angular movement detection device 296. Image detector 298, processor 294, angular movement detection device 296, and gimbals 300 are similar to image detector 108 (FIG. 2A), processor 104, angular movement detection device 106, and gimbals 110, respectively, and operate together similar to system 100. Alternatively, processor 294 is similar to processor 164 (FIG. 3). Further alternatively, system 290 can include a seeker (not shown), a directional stabilizer (not shown), and a user interface (not shown), similar to seeker 182, directional stabilizer 184 and user interface 186, respectively.

Gyroscope 302 detects rotations of gimbals 300 and of image detector 298, relative to a frame of reference. Movement processor 304 directs servo motor 306 to move gimbals 300 (and thus image detector 298), according to a signal received from gyroscope 302. Processor 294 produces an image of a scene 308 detected by image detector 298, according to a video signal received from image detector 298. Since image detector 298 and gimbals 300 are stabilized against disturbances, processor 294 produces a more stabilized image of scene 308, than that produced without stabilizing image detector 298 and gimbals 300.

Processor 294 operates also as a correlator (i.e., shifts the pixels of a current image detected by image detector 298, according to displacement of landmarks in the current image, relative to a previous image detected by image detector 298, wherein the displacements are detected by processor 294). Thus, system 290 can cover a broader range of disturbances and provide a more stabilized image than that provided by system 160 (FIG. 3).

According to a further aspect of the disclosed technique, an angular movement detection module is incorporated with an image stabilizing system as known in the art, as an add-on assembly. The angular movement detection module detects the rotations of the image detector and stabilizes the detected image according to the disclosed technique.

Figure 8:
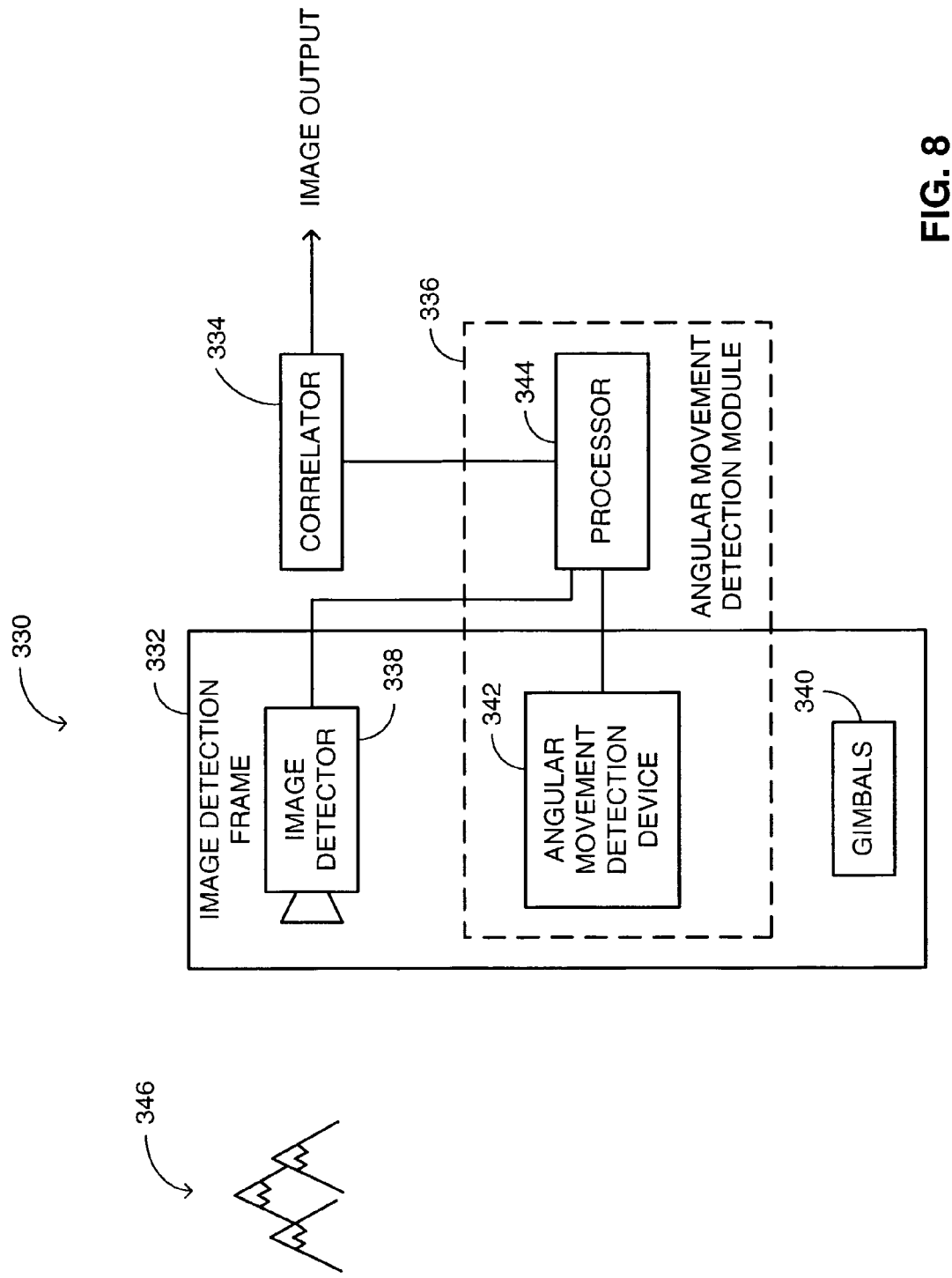
FIG. 8 is a schematic illustration of a system, for stabilizing an image of a scene detected by an image detector subjected to disturbances, constructed and operative in accordance with a further embodiment of the disclosed technique.

Reference is now made to FIG. 8, which is a schematic illustration of a system, generally referenced 330, for stabilizing an image of a scene detected by an image detector subjected to disturbances, constructed and operative in accordance with a further embodiment of the disclosed technique. System 330 includes an image detection frame 332, a correlator 334, and an angular movement detection module 336. Image detection frame 332 includes an image detector 338 and gimbals 340. Angular movement detection module 336 includes an angular movement detection device 342 and a processor 344. Image detector 338 detects images of a scene 346.

Gimbals 340 is similar to gimbals 300 (FIG. 7). Angular movement detection device 342 and processor 344 are similar to angular movement detection device 106 (FIG. 2A) and processor 104, respectively. Angular movement detection device 342 is integrated with processor 344. Alternatively, angular movement detection device 342 and processor 344 are separate devices. Correlator 334 is a processor which shifts the pixels of a current image of scene 346 detected by image detector 338, according to displacement of landmarks in the current image, relative to a previous image detected by image detector 338, wherein the displacements are detected by correlator 334.

Image detector 338 is firmly mechanically coupled with gimbals 340. Angular movement detection device 342 is firmly mechanically coupled with image detector 338. Processor 344 is electrically coupled with image detector 338, angular movement detection device 342 and with correlator 334. Angular movement detection device 342, processor 344, image detector 338 and gimbals 340, together operate similar to system 100 (FIG. 2A), as described herein above.

It will be appreciated by persons skilled in the art that the disclosed technique is not limited to what has been particularly shown and described hereinabove. Rather the scope of the disclosed technique is defined only by the claims, which follow.

The invention claimed is:

1. System for producing a stabilized image of a scene viewed by an image detector, the image detector detecting a plurality of images of the scene, the image detector being supported by gimbals, the gimbals including a servo system for moving the gimbals at at least one degree of freedom, the system comprising:
   an angular movement detection device firmly coupled with said image detector, said angular movement detection device detecting at least a portion of angular movements of said image detector about at least one axis of rotation, said angular movement detection device producing an angular output respective of said at least one portion;
   an angular movement filter coupled with said angular movement detection device, said angular movement filter receiving said angular output, said angular movement filter producing a filtered angular output by substantially filtering out from said angular output, spontaneously generated noise respective of said angular movement detection device, wherein said angular movement filter further receives at least one control signal, and wherein said angular movement filter produces said filtered angular output, by substantially filtering out said at least one control signal from said angular output;
   a processor coupled with said angular movement filter and with said image detector, said processor receiving said images from said image detector, and said filtered angular output from said angular movement filter, said processor determining at least one shifting displacement and at least one shifting direction for shifting a current image detected by said image detector, relative to a reference image of said scene detected by said image detector, according to said filtered angular output, said processor producing said stabilized image, by shifting said current image by said at least one shifting displacement and in said at least one shifting direction;
   wherein said processor comprises:
      an integrator coupled with said angular movement filter, said integrator receiving said filtered angular output, said integrator producing an integrated filtered angular output, by performing an integration operation on said filtered angular output; and
      an image processor coupled with said image detector and with said integrator, said image processor receiving said images from said image detector, said image processor receiving said integrated filtered angular output from said integrator, said image processor determining said at least one shifting displacement and said at least one shifting direction according to said integrated filtered angular output, said image processor shifting said current image by said at least one shifting displacement and in said at least one shifting direction;
   a scene tracker coupled with said image processor, said servo system of said gimbals, and with said angular movement filter, said scene tracker tracking said scene by processing said stabilized image, said scene tracker sending a scene tracking signal to said servo system to move said image detector for tracking said scene, said scene tracker sending said scene tracking signal to said angular movement filter; and
   a target tracker coupled with said image processor, said servo system, and with said angular movement filter, said target tracker tracking a moving target within said scene by processing said stabilized image, said target tracker sending a target tracking signal to said servo system to move said image detector for tracking said moving target in said scene, said target tracker sending said target tracking signal to said angular movement filter,
   wherein said at least one control signal includes at least one of said scene tracking signal and said target tracking signal.

2. The system according to claim 1, wherein said at least one portion is selected from the list consisting of:
   pitch:
   yaw; and
   roll.

3. The system according to claim 1, wherein said processor receives from said angular movement filter, a filtered reference angular output respective of said at least one portion when said image detector detects said reference image,
   wherein said processor associates said filtered reference angular output with said reference image,
   wherein said processor receives from said angular movement filter, a filtered current angular output respective of said at least one portion when said image detector detects said current image,
   wherein said processor associates said filtered current angular output with said current image, and
   wherein said processor determines said at least one shifting displacement and said at least one shifting direction, by comparing said filtered current angular output with said filtered reference angular output.

4. The system according to claim 1, wherein said reference image is an image of said scene detected by said image detector, substantially coincident with an activation event of said system.

5. The system according to claim 1, wherein said reference image is one of said images detected by said image detector, before detecting said current image.

6. The system according to claim 1, wherein said angular output is respective of a parameter selected from the list consisting of:
   angular displacement;
   angular velocity; and
   linear acceleration.

7. The system according to claim 1, wherein said angular movement detection device is a device selected from the list consisting of:
   electromechanical free gyro;
   rate gyro;
   rate integrating gyro;
   dynamically tuned gyro;
   Coriolis gyro;
   interferometric fiber optic gyro;
   ring laser gyro;

inertial measurement unit;
inertial navigation system; and
inertial sensor.

8. The system according to claim 1, wherein said processor determines said at least one shifting displacement according to the characteristics of an optical assembly associated with said image detector, and
   wherein said at least one shifting direction is substantially opposite to at least one other respective direction associated with a respective one of said at least one portion.

9. The system according to claim 1, further comprising a directional stabilizer coupled with said servo system of said gimbals and with said angular movement filter, said directional stabilizer detecting at least one of pitch, yaw and roll of said image detector, said directional stabilizer sending a directional corrective signal to said servo system of said gimbals to move said image detector to compensate for at least one of said pitch, yaw and roll, said directional stabilizer sending said directional corrective signal to said angular movement filter, wherein said at least one control signal includes said directional corrective signal.

10. The system according to claim 1, further comprising a user interface coupled with said servo system of said gimbals and with said angular movement filter, said user interface producing a movement command signal to move said image detector, according to a user command received from a user, said user interface sending said movement command signal to said servo system to move said image detector according to said user command, said user interface sending said movement command signal to said angular movement filter,
   wherein said at least one control signal includes said movement command signal.

11. The system according to claim 10, wherein said user interface is selected from the list consisting of:
   joystick; and
   coordinate input device.

12. The system according to claim 1, wherein said angular movement filter comprises:
   a coordinate transformation module coupled with said angular movement detection device at a junction, said coordinate transformation module receiving said at least one control signal, said coordinate transformation module producing a transformed signal by transforming said at least one control signal, from a respective at least one coordinate system associated with said at least one control signal, to a coordinate system associated with said image detector, said transformed signal to be subtracted from said angular output to produce a control-free signal; and
   a noise filter coupled with said angular movement detection device and with said coordinate transformation module at said junction, and further coupled with said integrator, said noise filter producing said filtered angular output, by filtering out spontaneously generated noise respective of said angular movement detection device, from said control-free signal.

13. The system according to claim 12, wherein any of said noise filter and said angular movement filter is selected from the list consisting of:
   Kalman filter;
   extended Kalman filter;
   unscented Kalman filter;
   recursive least square algorithm; and
   interacting multiple model filter.

14. The system according to claim 1, wherein said spontaneously generated noise is selected from the list consisting of:
   calibration factor instability factor;
   temperature dependent parameters;
   mounting misalignment of angular detector on the said gimbals;
   angle random walk;
   bias instability;
   rate random walk;
   rate ramp;
   Random drift;
   quantization noise;
   correlated noise; and
   sinusoidal noise.

15. The system according to claim 1, wherein said image processor comprises:
   a movement processing module coupled with said integrator, said movement processing module determining said at least one shifting displacement and said at least one shifting direction, according to said integrated filtered angular output: and
   an image transformation module, coupled with said image detector and with said movement processing module, said image transformation module shifting said current image by said at least one shifting displacement and in said at least one shifting direction.

16. The system according to claim 15, further comprising a range finder coupled with said image transformation module, said range finder determining the range between said image detector and said scene,
   wherein said image transformation module modifies a scale of said current image according to movement of said image detector toward or away from said scene.

17. The system according to claim 15, wherein said image processor further comprises an image summing module coupled with said image transformation module, said image summing module adding together a series of images produced by said image transformation module.

18. The system according to claim 15, wherein said image processor further comprises a buffer coupled with said image transformation module, said buffer accumulating a series of images produced by said image transformation module.

19. The system according to claim 15, wherein said image processor further comprises an image enhancement module coupled with said image transformation module, said image enhancement module performing an enhancement operation on said image.

20. The system according to claim 19, wherein enhancement operation is selected from the list consisting of:
   varying the contrast of said image; and
   varying the brightness of said image.

21. The system according to claim 1, wherein said processor produces said stabilized image for a device selected from the list consisting of:
   display;
   memory; and
   communication interface.

22. The system according to claim 1, wherein said image detector is selected from the list consisting of:
   forward looking infrared camera:
   gated camera;
   television camera; and
   high definition television camera.

23. The system according to claim 1, wherein said image detector is selected from the list consisting of:
   charge-coupled device; and
   complementary metal oxide semiconductor.

24. The system according to claim 1, further comprising:
   another angular movement detection device coupled with said image detector, said other angular movement detection device detecting at least another portion of said angular movements, said other angular movement detection device producing another angular output according to said at least other portion; and another processor coupled with said other angular movement detection device and with said servo system, said other processor determining a compensating signal according to said at other angular output, for compensating for said at least other portion, said servo system moving said image detector according to said compensating signal, by at least another displacement proportional to said at least other portion, and in at least one opposite direction.

25. The system according to claim 24, wherein said angular movement detection device detects said at least one portion at a first predetermined range of at least one angular parameter, and wherein said other angular movement detection device detects said at least other portion at a second predetermined range of said at least one angular parameter.

26. The system according to claim 24, wherein said angular movement detection device detects said at least one portion at a first predetermined range of angular frequencies, and wherein said other angular movement detection device detects said at least other portion at a second predetermined range of angular frequencies.

27. The system according to claim 24, wherein a single angular movement detection device comprises said angular movement detection device and said other angular movement detection device.

28. The system according to claim 1, wherein said system is coupled with a vehicle.

29. The system according to claim 28, wherein said vehicle is selected from the list consisting of:
flying vehicle;
ground vehicle; and
marine vehicle.

30. The system according to claim 1, wherein said system is coupled with an observation post.

31. The system according to claim 1, wherein said system is coupled with a portable device.

32. The system according to claim 1, wherein said at least one axis of rotation is respective of said image detector.

33. The system according to claim 1, wherein said at least one axis of rotation is respective of said gimbals.

34. The system according to claim 1, further comprising another angular movement detection device firmly coupled with said gimbals, said other angular movement detection device detecting at least another portion of said angular movements, and producing a respective other angular output, wherein said servo system receives said respective other angular output from said other angular movement detection device, and wherein said servo system moves said gimbals according to said respective other angular output, to stabilize said gimbals against said at least other portion.

35. Method for producing a stabilized image of a scene viewed by an image detector, the method comprising the procedures of:

producing a transformed signal by transforming at least one control signal, from a respective at least one coordinate system associated with said at least one control signal, to a coordinate system associated with said image detector;

producing a control-free signal by subtracting said transformed signal from said angular output;

producing a filtered angular output, by substantially filtering out from said control-free signal, spontaneously generated noise, respective of said angular movement detection device;

producing a reference angular output respective of at least a portion of angular movements of said image detector, said reference angular output being associated with a reference image of said scene detected by said image detector;

producing a current angular output respective of said at least one portion, said current angular output being associated with a current image of said scene detected by said image detector, wherein each of said reference angular output and said current angular output is included in an angular output produced by an angular movement detection device, detecting said at least one portion;

producing a filtered reference angular output and a filtered current angular output, by substantially filtering out from said reference angular output and said current angular output, spontaneously generated noise, respective of said angular movement detection device;

determining at least one shifting displacement and at least one shifting direction, for shifting said current image relative to said reference image, by comparing said filtered current angular output with said filtered reference angular output; and shifting said current image by said at least one shifting displacement and in said at least one shifting direction.

36. The method according to claim 35, further comprising preliminary procedures of:
detecting said at least one portion; and
detecting a plurality of images of said scene by said image detector.

37. The method according to claim 35, wherein said at least one portion is selected from the list consisting of:
pitch;
yaw; and
roll.

38. The method according to claim 35, wherein said at least one shifting direction is substantially opposite to respective at least one other direction, associated with a respective one of said at least one portion.

39. The method according to claim 35, further comprising a procedure of integrating said filtered angular output, at least once.

40. The method according to claim 35, wherein before performing said procedure of determining, said method comprises the procedures of:
processing said stabilized image for tracking said scene;
producing a scene tracking signal; and
sending said scene tracking signal to a servo system of gimbals, said gimbals being firmly coupled with said image detector,
wherein said at least one control signal includes said scene tracking signal.

41. The method according to claim 35, wherein before performing said procedure of determining, said method comprises the procedures of:
processing said stabilized image for tracking a moving target within said scene;
producing a target tracking signal; and
sending said target tracking signal to a servo system of gimbals, said gimbals being firmly coupled with said image detector,
wherein said at least one control signal includes said target tracking signal.

42. The method according to claim 35, wherein before performing said procedure of determining, said method comprises the procedures of:
processing said stabilized image for stabilizing said image detector against at least one of pitch, yaw and roll of said image detector:
producing a directional corrective signal; and
sending said directional corrective signal to a servo system of gimbals, said gimbals being firmly coupled with said image detector,
wherein said at least one control signal includes said directional corrective signal.

43. The method according to claim 35, wherein before performing said procedure of determining, said method comprises the procedures of:
producing a movement command signal according to a user command, for moving said image detector; and
sending said movement command signal to a servo system of gimbals, said gimbals being firmly coupled with said image detector,
wherein said at least one control signal includes said movement command signal.

44. The method according to claim 35, further comprising the procedures of:
determining a range between said image detector and said scene; and
modifying magnification of said stabilized image according to the movement of said image detector toward or away from said scene.

45. The method according to claim 35, further comprising a procedure of stabilizing gimbals by a servo system coupled with said gimbals, according to at least another portion of said angular movements, before performing said procedure of determining, said gimbals being firmly coupled with said image detector.

46. The method according to claim 35, further comprising the procedures of:
repeating said procedures of determining and shifting for a set of images; and
adding together said set of shifted images to produce a superposed image.

47. The method according to claim 35, further comprising the procedures of:
repeating said procedures of determining and shifting for a set of images; and
accumulating said set of shifted images in a buffer.

48. The method according to claim 35, further comprising a procedure of performing an enhancement operation on said image.

49. Apparatus for viewing a substantially blur-free image of a scene, the apparatus comprising:
an optical assembly; and
a system for producing a stabilized image of said scene viewed by an image detector, said image detector detecting a plurality of images of said scene, said image detector being supported by gimbals, said gimbals including a servo system for moving said gimbals at at least one degree of freedom, said apparatus comprising:
an angular movement detection device firmly coupled with said image detector, said angular movement detection device detecting at least a portion of angular movements of said image detector about at least one axis of rotation, said angular movement detection device producing an angular output respective of said at least one portion;
an angular movement filter coupled with said angular movement detection device, said angular movement filter receiving said angular output, said angular movement filter producing a filtered angular output by substantially filtering out from said angular output, spontaneously generated noise respective of said angular movement detection device, wherein said angular movement filter further receives at least one control signal, and wherein said angular movement filter produces said filtered angular output, by substantially filtered out said at least one control signal from said angular output;
a processor coupled with said angular movement filter and with said image detector, said processor receiving said images from said image detector, and said angular output from said angular movement filter, said processor determining at least one shifting displacement and at least one shifting direction for shifting a current image detected by said image detector, relative to a reference image of said scene detected by said image detector, according to said filtered angular output, said processor producing said stabilized image, by shifting said current image by said at least one shifting displacement and in said at least one shifting direction; wherein said processor comprises:
an integrator coupled with said angular movement filter, said integrator receiving said filtered angular output, said integrator producing an integrated filtered angular output, by performing an integration operation on said filtered angular output; and
an image processor coupled with said image detector and with said integrator, said image processor receiving said images from said image detector, said image processor receiving said integrated filtered angular output from said integrator, said image processor determining said at least one shifting displacement and said at least one shifting direction according to said integrated filtered angular output, said image processor shifting said current image by said at least one shifting displacement and in said at least one shifting direction;
a scene tracker coupled with said image processor, said servo system of said gimbals, and with said angular movement filter, said scene tracker tracking said scene by processing said stabilized image, said scene tracker sending a scene tracking signal to said servo system to move said image detector for tracking said scene, said scene tracker sending said scene tracking signal to said angular movement filter; and
a target tracker coupled with said image processor, said servo system, and with said angular movement filter, said target tracker tracking a moving target within said scene by processing said stabilized image, said target tracker sending a target tracking signal to said servo system to move said image detector for tracking said moving target in said scene, said target tracker sending said target tracking signal to said angular movement filter,
wherein said at least one control signal includes at least one of said scene tracking signal and said target tracking signal.

50. The apparatus according to claim 49, wherein said optical assembly is selected from the list consisting of:
microscope;
binoculars;
head-up display;
head-mounted display;
night vision system;
telescope;
periscope;
light amplifier; and
a combination of above.

* * * * *